(12) United States Patent
Zhitomirskiy

(10) Patent No.: US 7,868,609 B2
(45) Date of Patent: Jan. 11, 2011

(54) POSITION SENSOR

(75) Inventor: Victor Evgenievich Zhitomirskiy, Harston (GB)

(73) Assignee: Sagentia Limited, Harston, Cambridge (GB)

( * ) Notice: Subject to any disclaimer, the term of this patent is extended or adjusted under 35 U.S.C. 154(b) by 1022 days.

(21) Appl. No.: 10/598,053

(22) PCT Filed: Mar. 1, 2005

(86) PCT No.: PCT/GB2005/000775

§ 371 (c)(1),
(2), (4) Date: Aug. 16, 2006

(87) PCT Pub. No.: WO2005/085763

PCT Pub. Date: Sep. 15, 2005

(65) Prior Publication Data

US 2007/0194781 A1 Aug. 23, 2007

(30) Foreign Application Priority Data

Mar. 1, 2004 (GB) ................... 0404585.2
Sep. 17, 2004 (GB) ................... 0420735.3

(51) Int. Cl.
*G01B 7/14* (2006.01)
(52) U.S. Cl. ............... 324/207.17; 324/207.24; 324/207.26
(58) Field of Classification Search ............ 324/207.15, 324/207.17, 207.24–207.26; 73/514.31, 73/514.39
See application file for complete search history.

(56) References Cited

U.S. PATENT DOCUMENTS

| 3,331,045 | A | 7/1967 | Weiss et al. |
| 4,774,465 | A | 9/1988 | Nilius |
| 4,950,988 | A | 8/1990 | Garshelis |

(Continued)

FOREIGN PATENT DOCUMENTS

DE 3914787 11/1990

(Continued)

OTHER PUBLICATIONS

SPIES, Partial English Translation of DE19621886, Dec. 4, 1997.*

(Continued)

*Primary Examiner*—Bot L LeDynh
(74) *Attorney, Agent, or Firm*—Alston & Bird LLP

(57) ABSTRACT

A position encoder is provided for indicating the relative position between first and second relatively move members. One of the members carries a magnetic field generator which generates a magnetic field whose magnitude and direction vary with position. In a preferred embodiment, the other member carries an excitation winding, one or more sensor windings and a film of magnetizable material. The arrangement is such that the positionally varying magnetic field interacts with the film to change the mutual coupling between the excitation winding and the or each sensor winding. Excitation and processing circuitry is provided for energising the excitation winding and for processing the sensor signals to determine a value indicative of the relative position between the first and second relatively movable members.

25 Claims, 19 Drawing Sheets

U.S. PATENT DOCUMENTS

| | | | |
|---|---|---|---|
| 5,204,621 A | 4/1993 | Hermann et al. | |
| 5,280,239 A | 1/1994 | Klimovitsky et al. | |
| 5,604,621 A | 2/1997 | Fujikane | |
| 5,617,023 A | 4/1997 | Skalski | |
| 5,781,006 A | 7/1998 | Beichler | |
| 6,118,271 A | 9/2000 | Ely et al. | |
| 6,222,360 B1 | 4/2001 | Tischer et al. | |
| 6,265,867 B1 | 7/2001 | Fowler | |
| 6,605,939 B1 | 8/2003 | Jansseune et al. | |
| 6,653,828 B2 | 11/2003 | Dordet et al. | |
| 6,714,004 B2 | 3/2004 | Jagiella | |
| 7,321,229 B2 * | 1/2008 | Tapson | 324/207.17 |
| 7,482,803 B2 * | 1/2009 | Lee et al. | 324/207.25 |
| 2004/0036468 A1 | 2/2004 | Hoffelder et al. | |

FOREIGN PATENT DOCUMENTS

| | | |
|---|---|---|
| DE | 19621886 A1 | 12/1997 |
| DE | 19919424 | 11/2000 |
| DE | 10250846 | 5/2004 |
| EP | 0191223 | 8/1986 |
| EP | 0896205 A1 | 2/1999 |
| EP | 1048932 A1 | 11/2000 |
| WO | WO-95/31696 A1 | 11/1995 |
| WO | WO-03/038379 A1 | 5/2003 |

OTHER PUBLICATIONS

International Search Report for International Application No. PCT/GB2005/000775, completed on Aug. 30, 2005.

Written Opinion for International Application No. PCT/GB2005/000775, completed on Aug. 30, 2005.

International Report on Patentability for corresponding International Application No. PCT/GB2005/000775 issued Sep. 5, 2006.

* cited by examiner

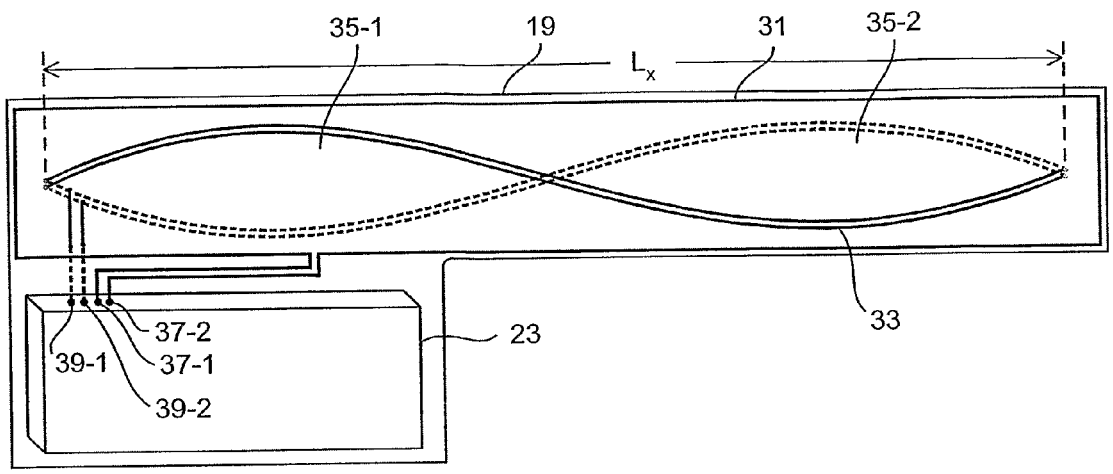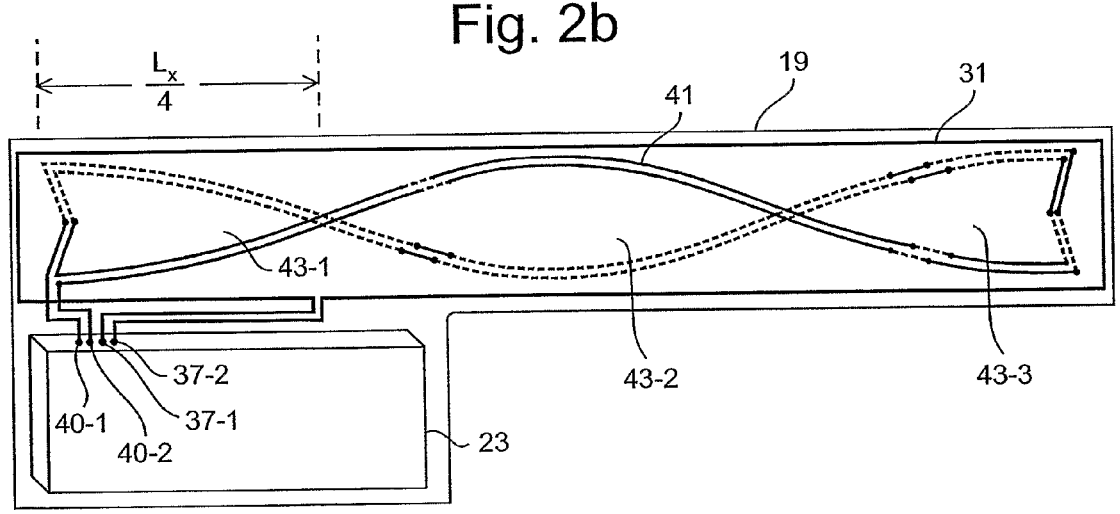

$\mu_{max} \sim 5000$

Fig. 7a
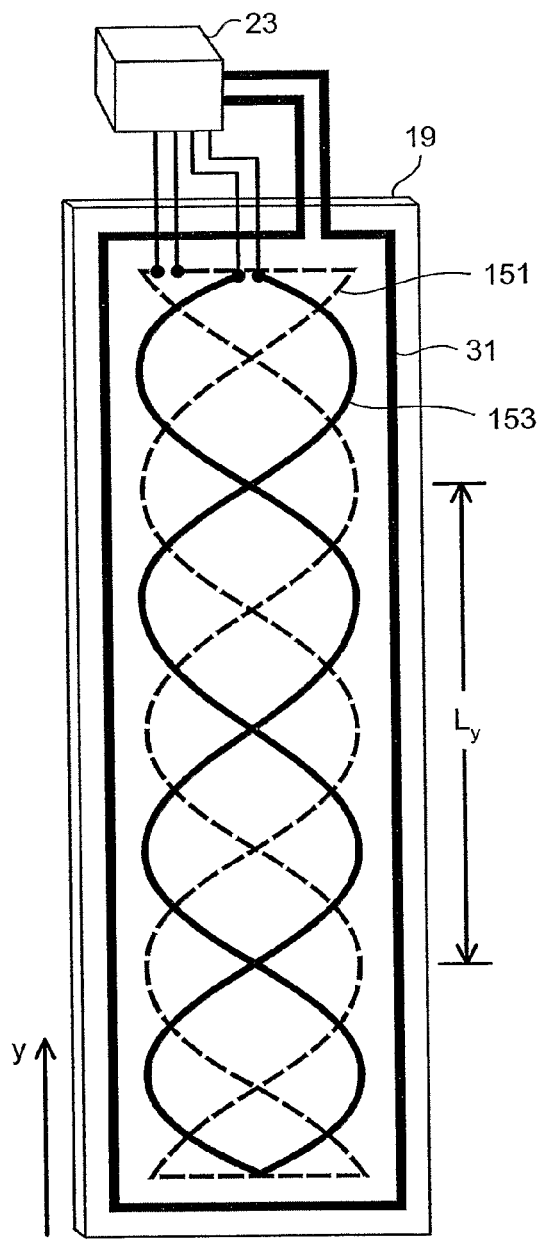
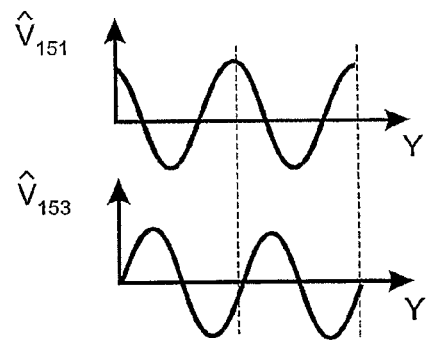
Fig. 7b
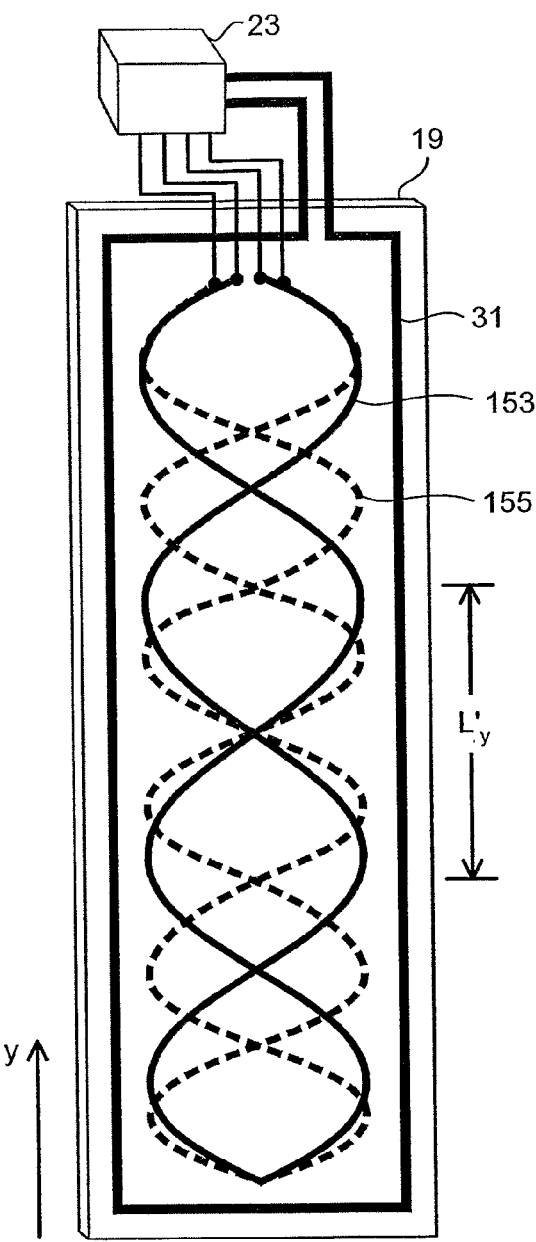
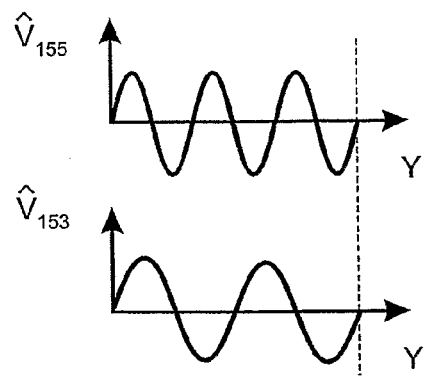

POSITION SENSOR

BACKGROUND OF THE INVENTION

1. Field of the Invention

The present invention relates to position sensors or encoders and to apparatus for use in such sensors or encoders. The invention has particular but not exclusive relevance to non-contact rotary and linear position encoders. Some embodiments of the invention are suitable for use in relatively small systems which operate at relatively high temperatures and in which there may be magnetic and electromagnetic interference. Other embodiments are suitable for use in systems having a large measurement range which require a sensor head which is relatively insensitive to mechanical misalignments, dirt, grease and the like.

2. Description of Related Art

Inductive position encoders are well known in the art and typically comprise a movable member, whose position is related to the machine about which position or motion information is desired, and a stationary member which is inductively coupled to the moving member. The stationary member typically includes a number of detectors which provide electrical output signals which can be processed to provide an indication of the position, direction, speed and/or acceleration of the movable member and hence for those of the related machine.

Some of these inductive position encoders employ an AC magnetic field generator mounted on the movable member and one or more sensor windings mounted on the stationary member. The magnetic field generator and the sensor windings are arranged so that the magnetic coupling between them varies with the position of the movable member relative to the stationary member. As a result, an output signal is obtained from each sensor winding which continuously varies with the position of the movable member.

The main limitation of this type of inductive position encoder is that the technique can only work if the space between the magnetic field generator and the sensor windings is free from metallic walls which cannot be penetrated by the AC magnetic field. This therefore limits the applications to which such inductive position sensors can be used.

Another type of inductive position sensor that is known uses permanent magnets and Hall Effect detectors. The problem with such Hall Effect detectors is that they are point magnetic field detectors which can only detect the presence or absence of the permanent magnet. Therefore, such Hall Effect systems do not provide a "continuous" output signal which varies with the position of the movable object.

Another type of inductive position sensor is a Flux Gate sensor which employs a film of soft magnetisable material. With this type of sensor, an AC excitation magnetic field is applied along the plane of the soft magnetisable material causing the material to be driven into and out of magnetic saturation. A DC magnet is usually provided on the movable member, the magnetic field of which interacts with the saturable magnetic element to cause some of the AC in-plane flux to be expelled from the material adjacent the magnet. A number of sensor windings are provided adjacent the material for detecting the flux that is expelled from the saturable element (which depends on the position of the magnet), to output a signal which depends on the position of the magnet relative to the sensor windings. As a result of the driving of the saturable magnetic element into and out of saturation, the output signals that are generated in such Flux Gate sensors are at twice the frequency of the AC excitation frequency. The applicant's earlier international application WO 97/14935 describes such a Flux Gate position sensor. The problem with such Flux Gate sensors is that they are relatively bulky as they employ a relatively large ferromagnetic core around which the excitation and sensor windings are typically wound. They also tend not to be as rugged as smaller more integrated sensor technologies such as the Hall Effect systems discussed above.

BRIEF SUMMARY OF THE INVENTION

The present invention aims to provide an alternative inductive position encoder and to provide novel components therefor.

According to one aspect, the present invention provides an apparatus for use in an inductive position encoder comprising:

first and second members which are relatively movable along a measuring path, the first member comprising a DC magnetic field generator for generating a DC magnetic field and the second member comprising at least one of an excitation winding and a sensor winding;

a film of magnetisable material having first and second principal surfaces which extend along the measuring path adjacent to the excitation and sensor windings;

wherein said DC magnetic field generator and said magnetisable material are arranged so that the magnetic field generated by the DC magnetic field generator interacts with a portion of the magnetisable material, the position of said portion being dependent upon the relative position between the first and second members;

wherein said excitation winding and said sensor winding are arranged so that upon the application of a cyclic drive signal to the excitation winding a signal is generated in the sensor winding which varies in dependence upon the position of the portion of the magnetisable material which interacts with said DC magnetic field generator and hence which varies with the relative position between the first and second members; and wherein said excitation winding is positioned relative to said film of magnetisable material such that upon the application of said cyclic drive signal to the excitation winding, a cyclic excitation magnetic field is generated which is predominantly directed perpendicular to the measuring path.

BRIEF DESCRIPTION OF THE SEVERAL VIEWS OF THE DRAWING(S)

A number of exemplary embodiments will now be described with reference to the accompanying drawings in which:

FIG. 1 is a partially exploded view illustrating a piston and cylinder assembly having an inductive position encoder for encoding the position of the piston within the cylinder;

FIG. 2a schematically illustrates in more detail the geometrical shape of the windings provided on a printed circuit board forming part of the inductive position encoder shown in FIG. 1a which form a sin sensor winding thereof;

FIG. 2b schematically illustrates in more detail the geometrical shape of the windings provided on the printed circuit board forming part of the inductive position encoder shown in FIG. 1a which form a cos sensor winding thereof;

FIG. 7a illustrates the geometrical form of a pair of multi-period sensor windings which may be used in an alternative embodiment of the inductive position encoder;

Figure 8:
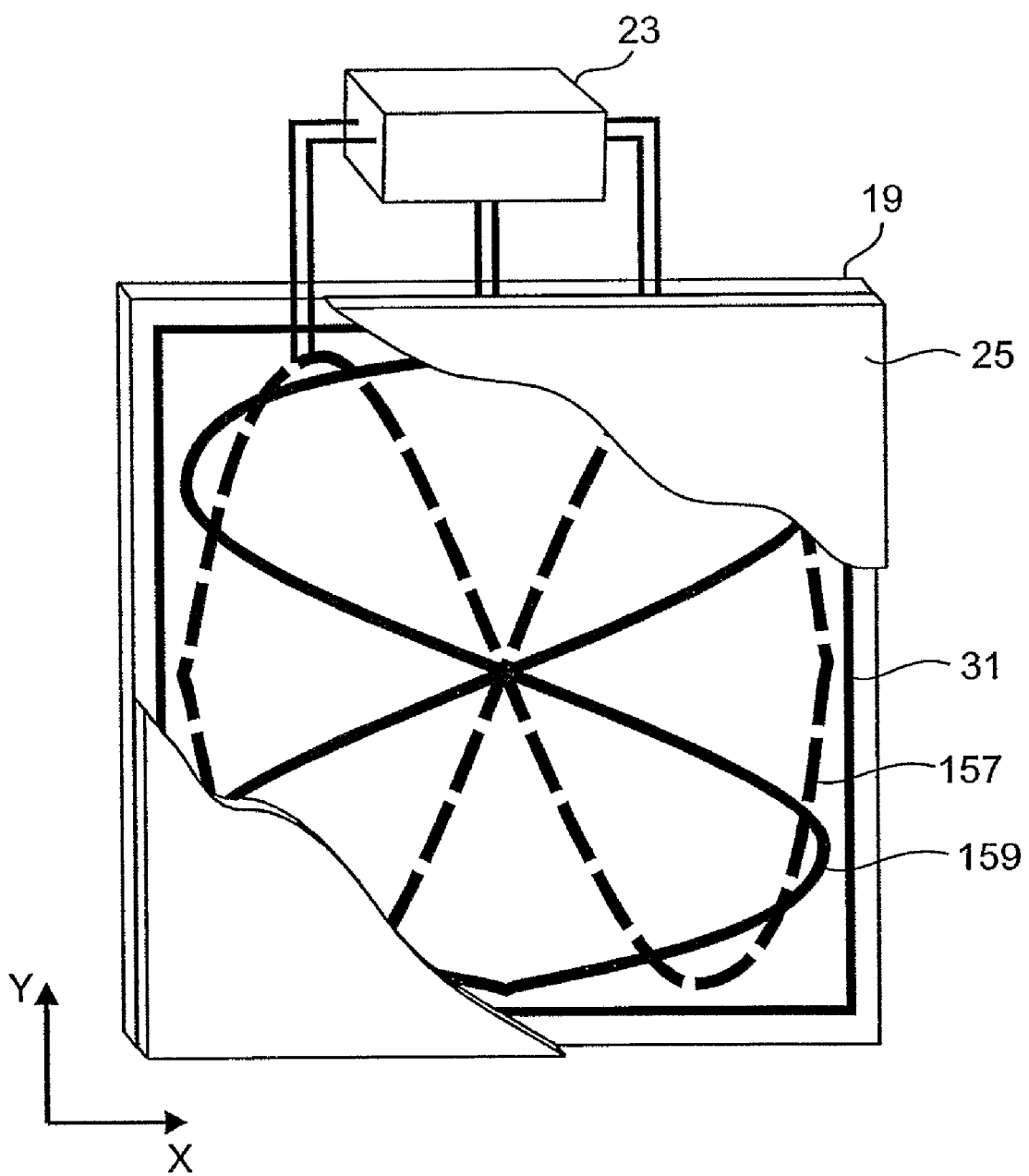
Figure 9:
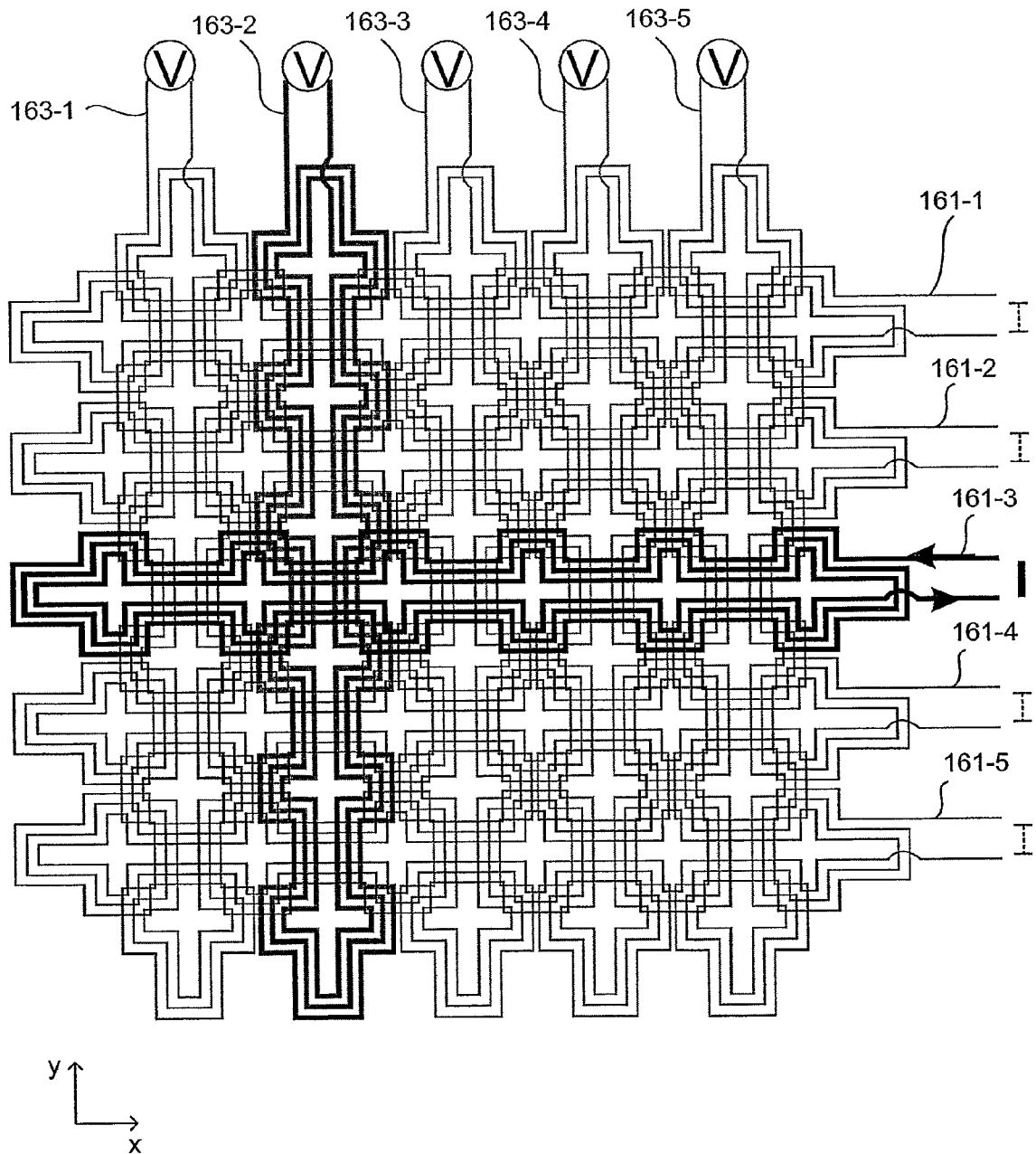
Figure 10A:
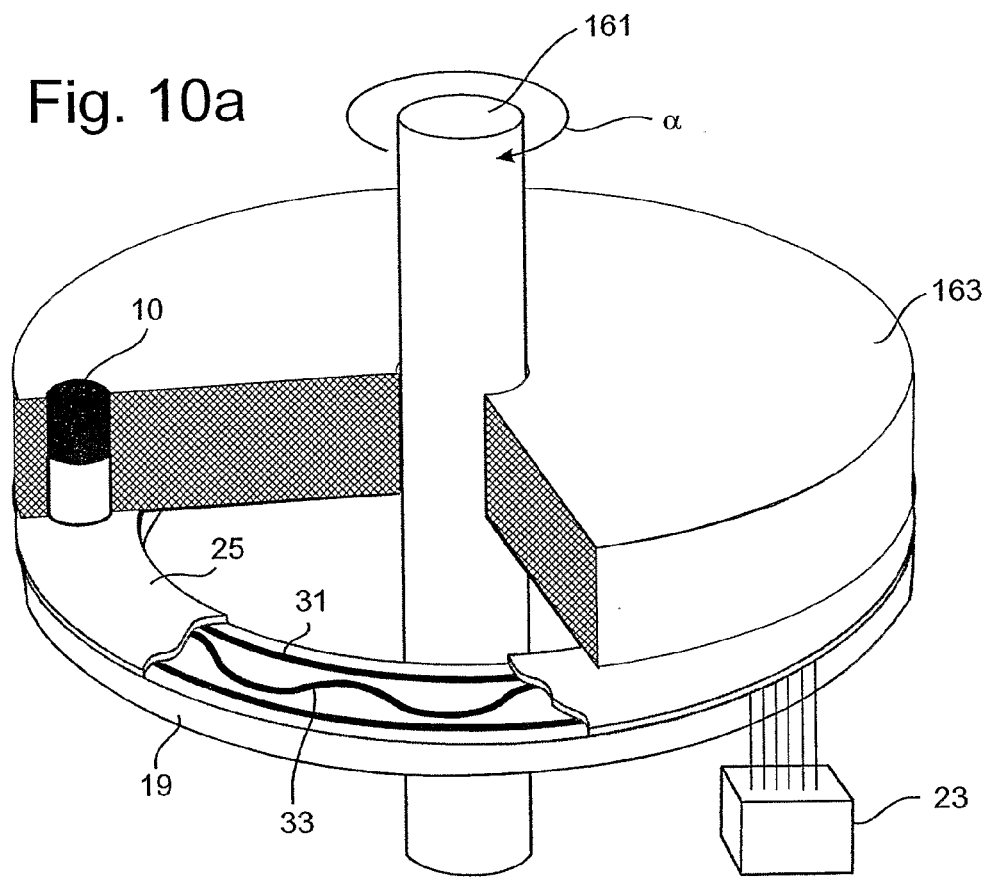
Figure 10B:
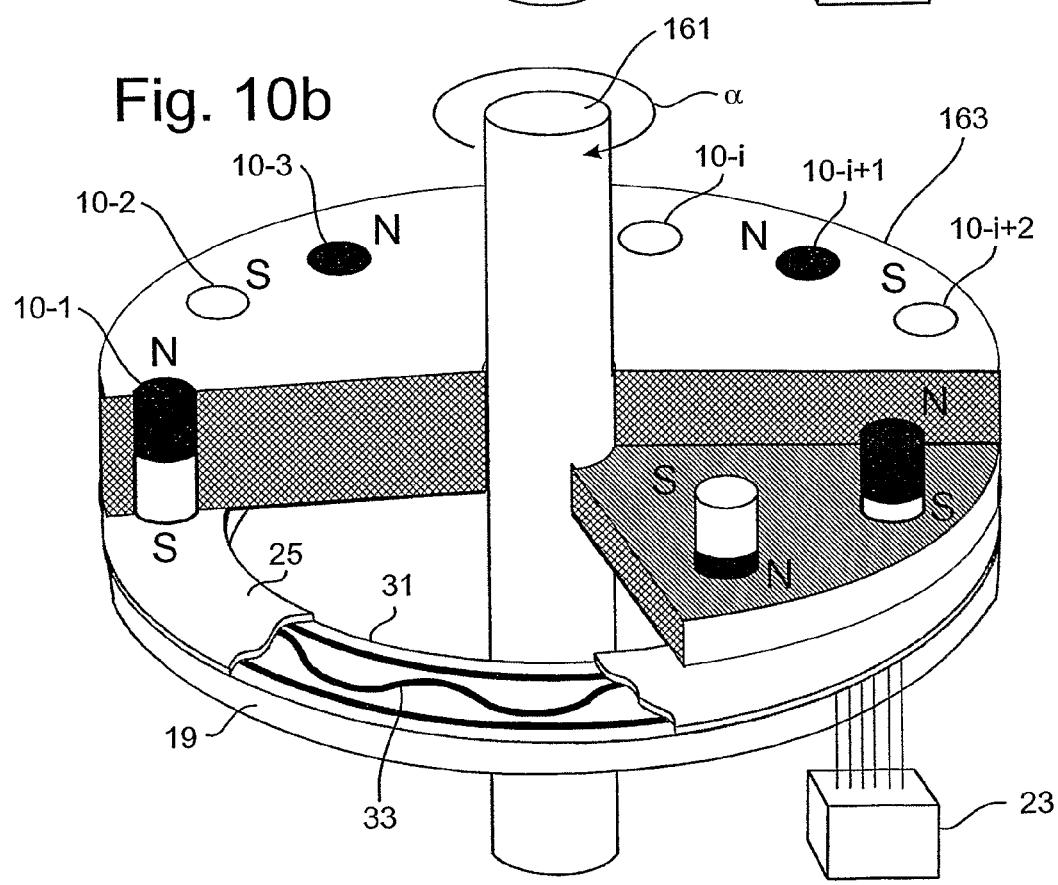
Figure 11:
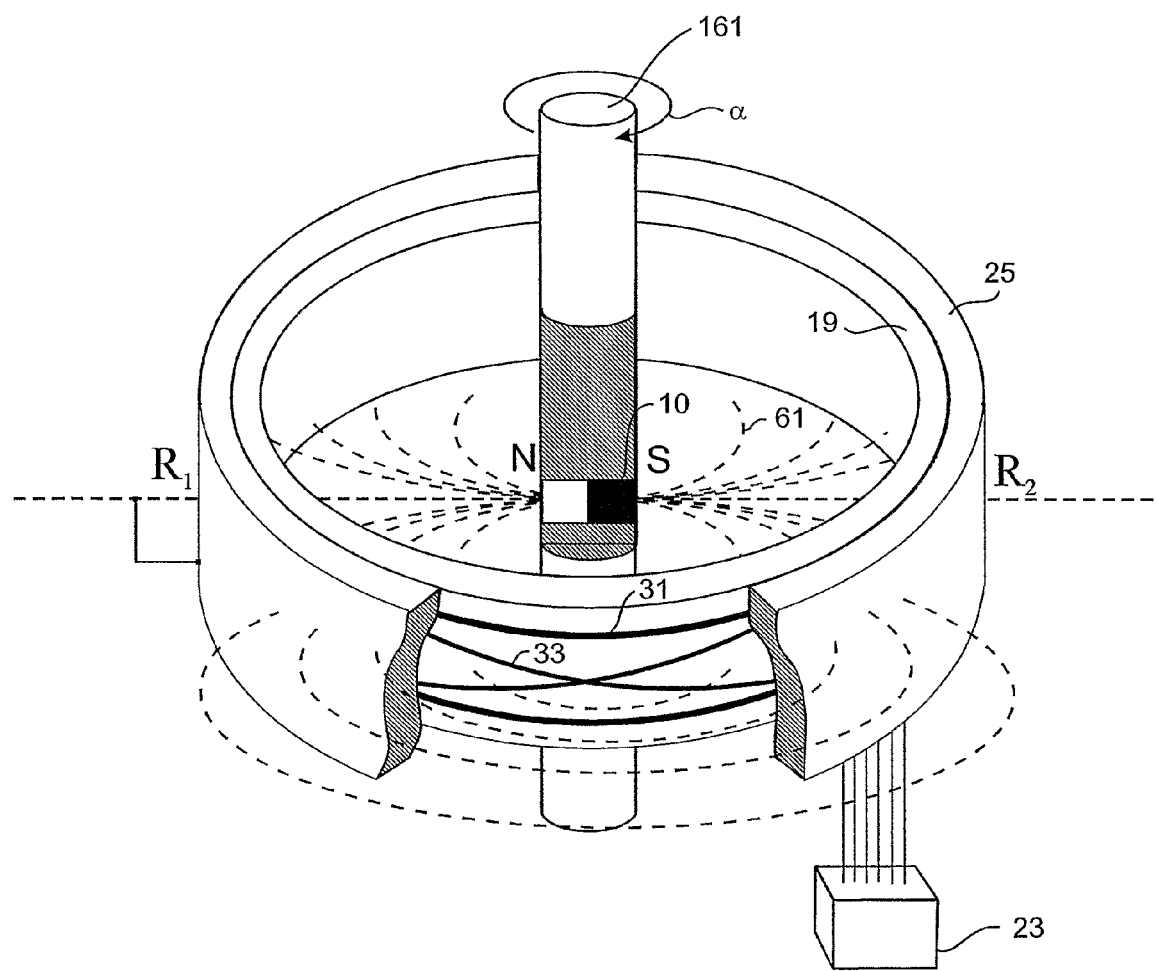
Figure 12:
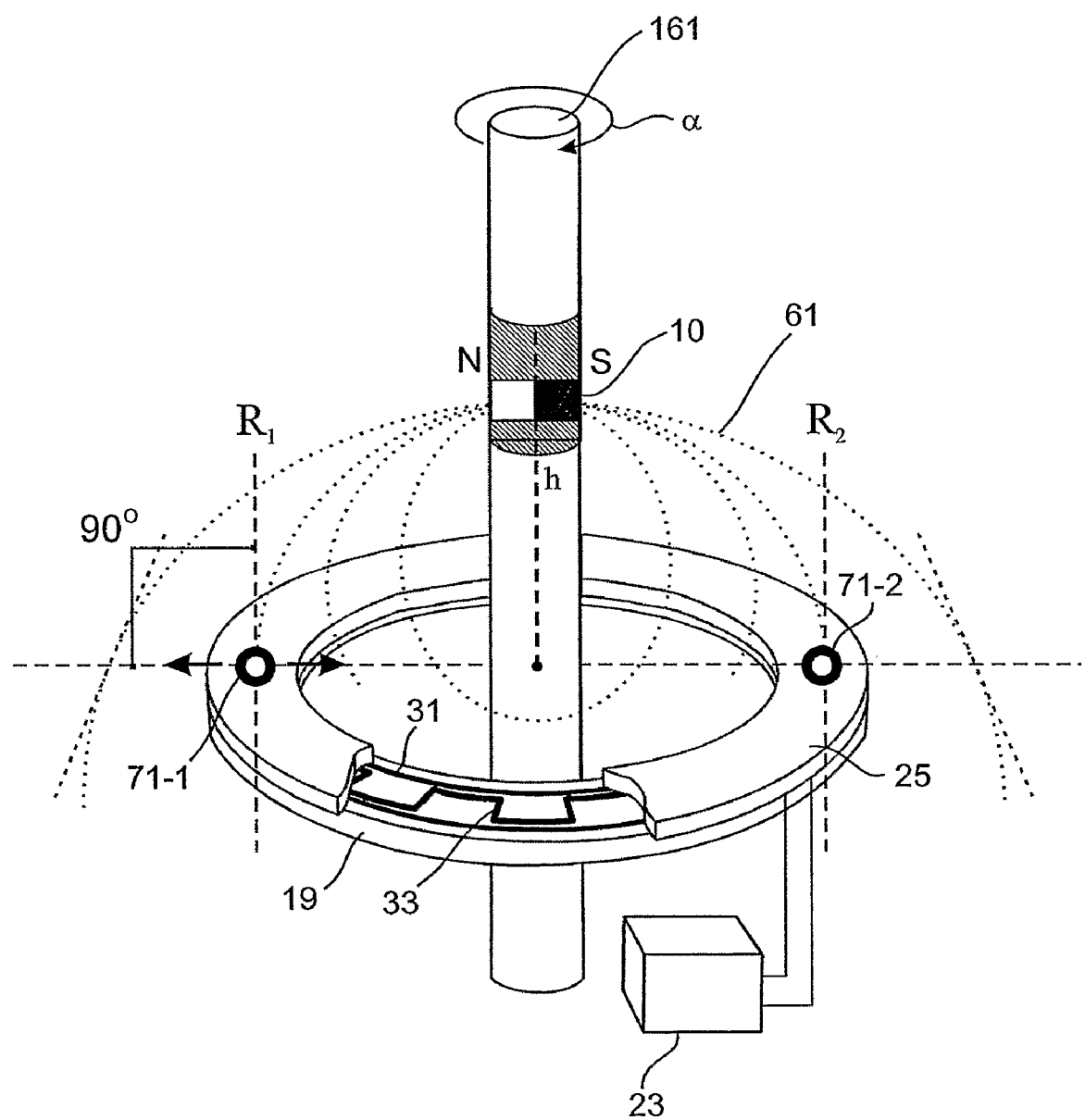
Figure 13:
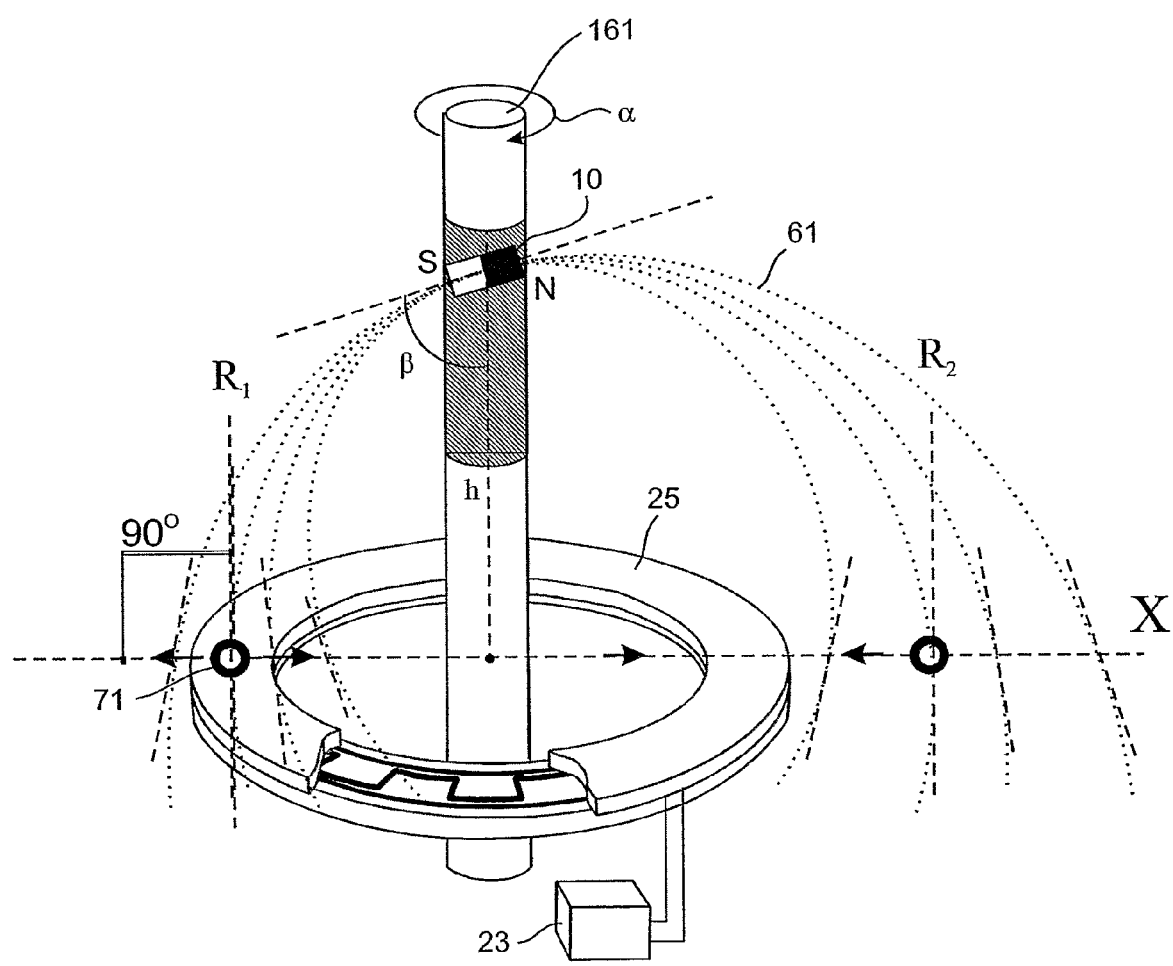
Figure 14:
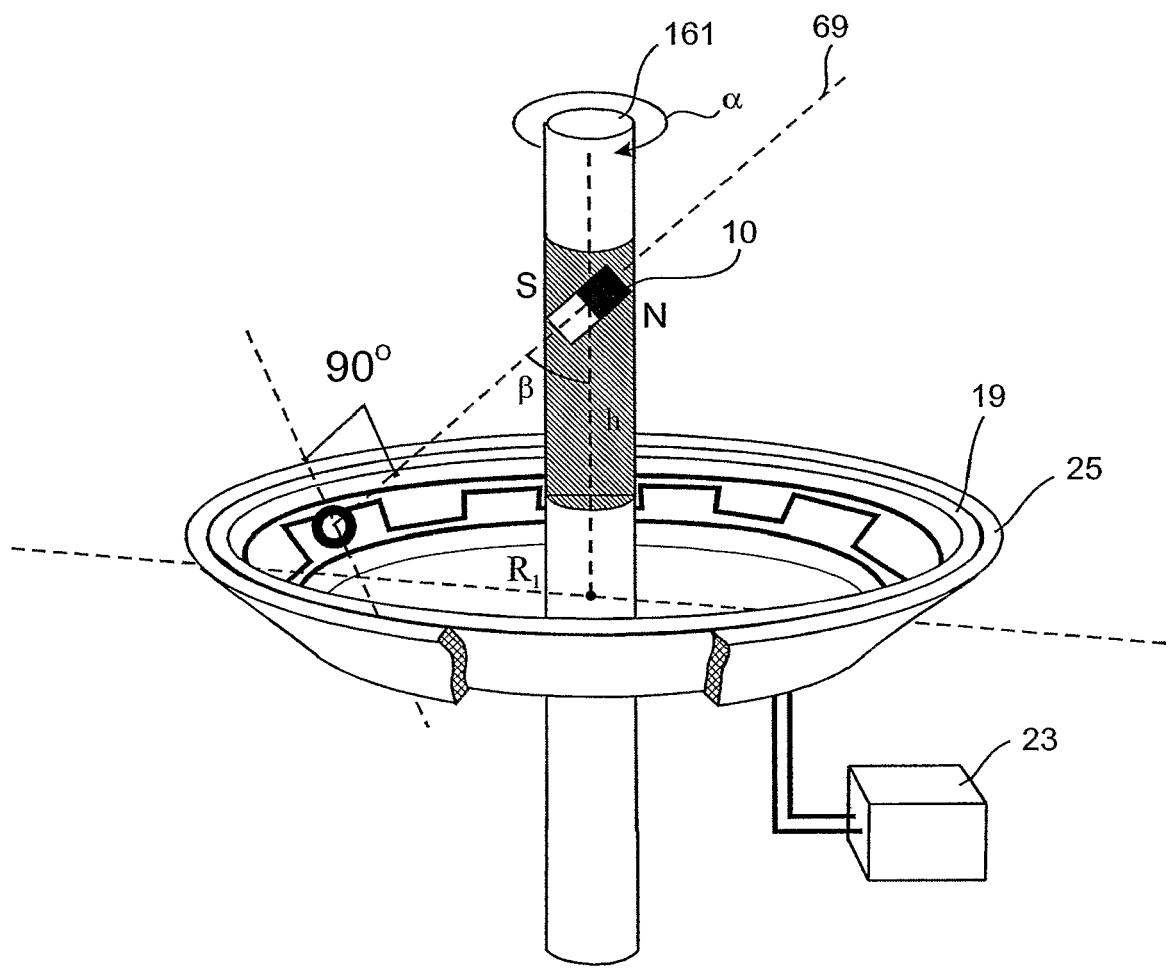
Figure 15:
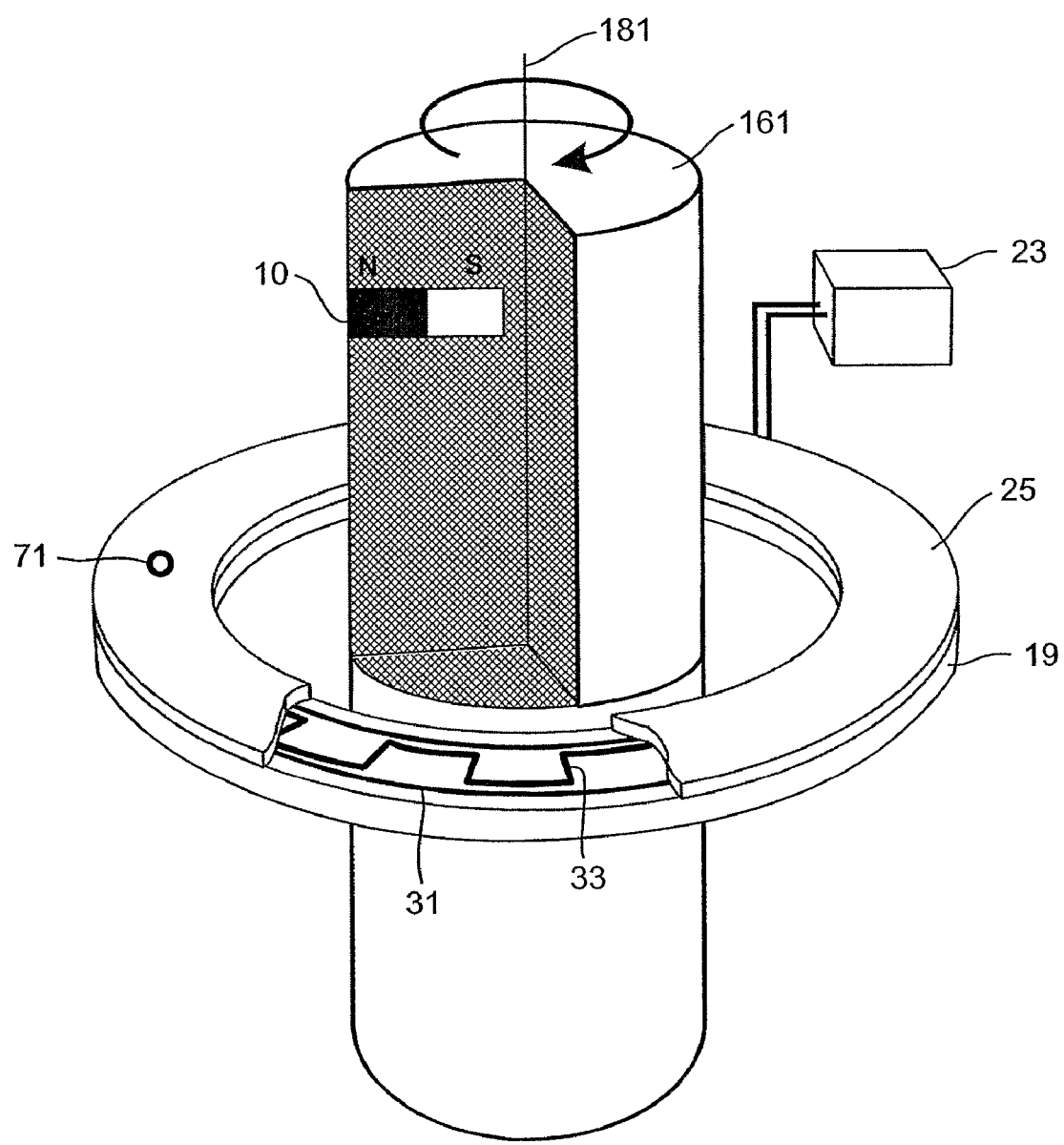
Figure 16:
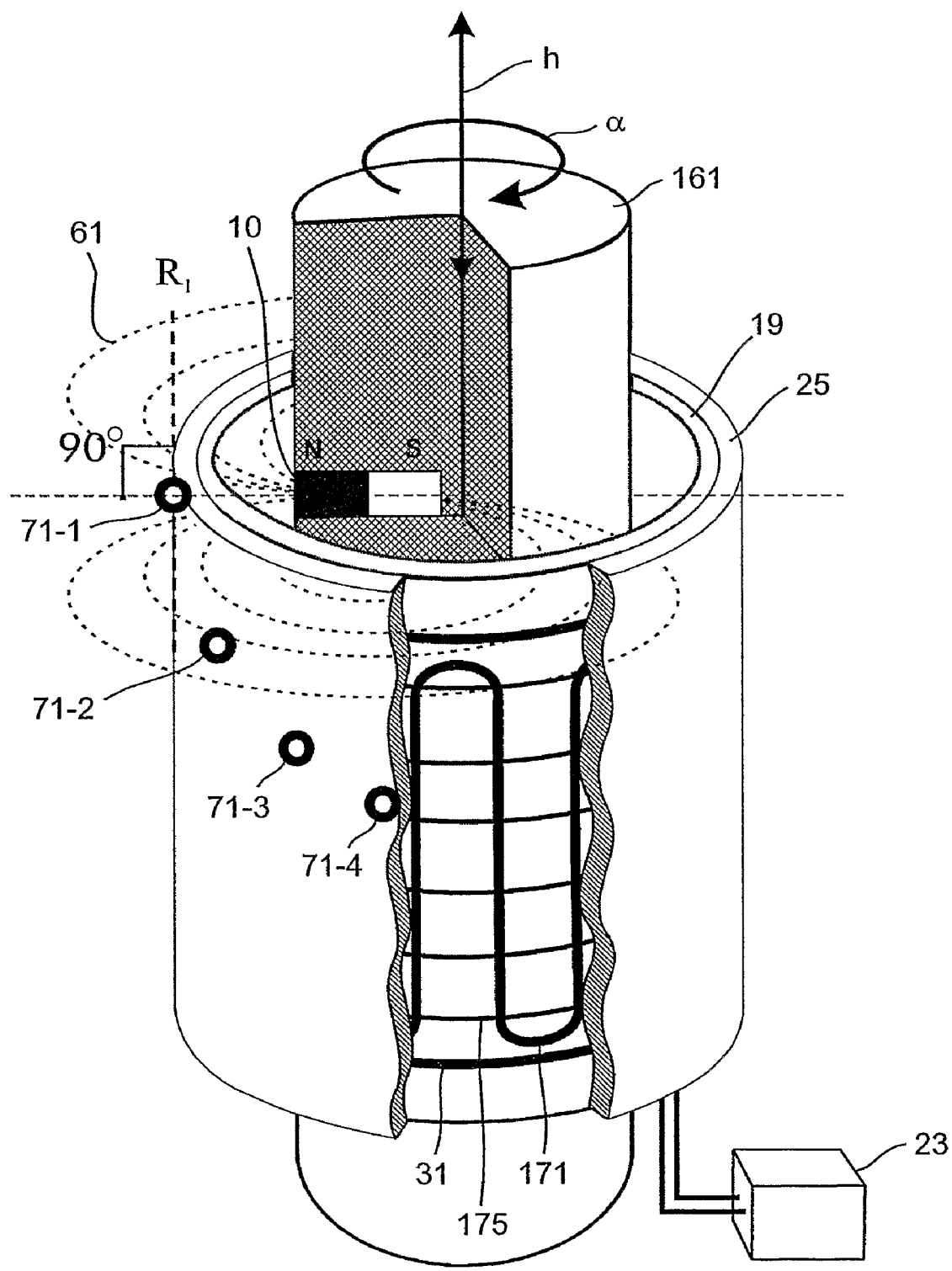
Figure 17:
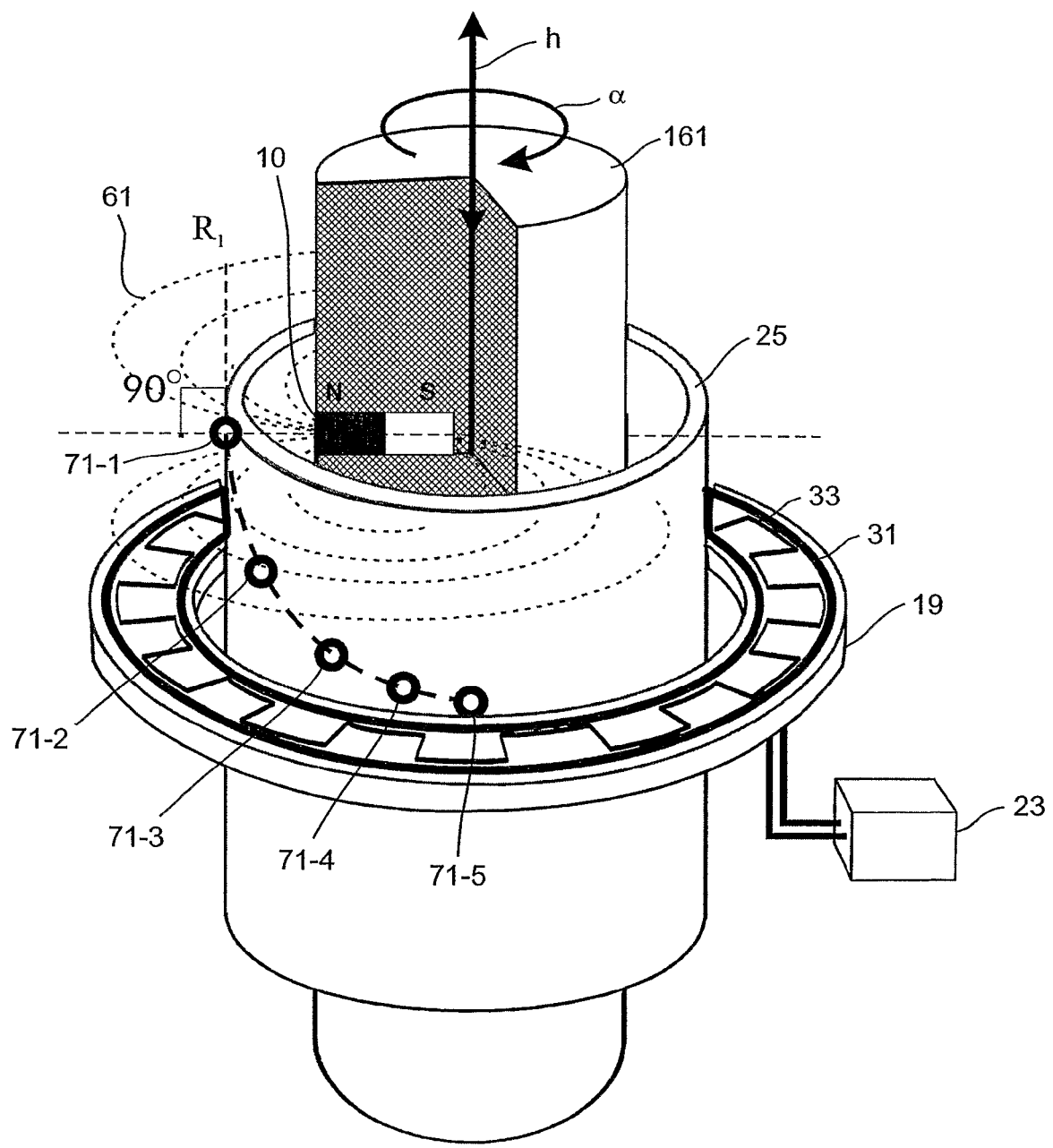
Figure 18:
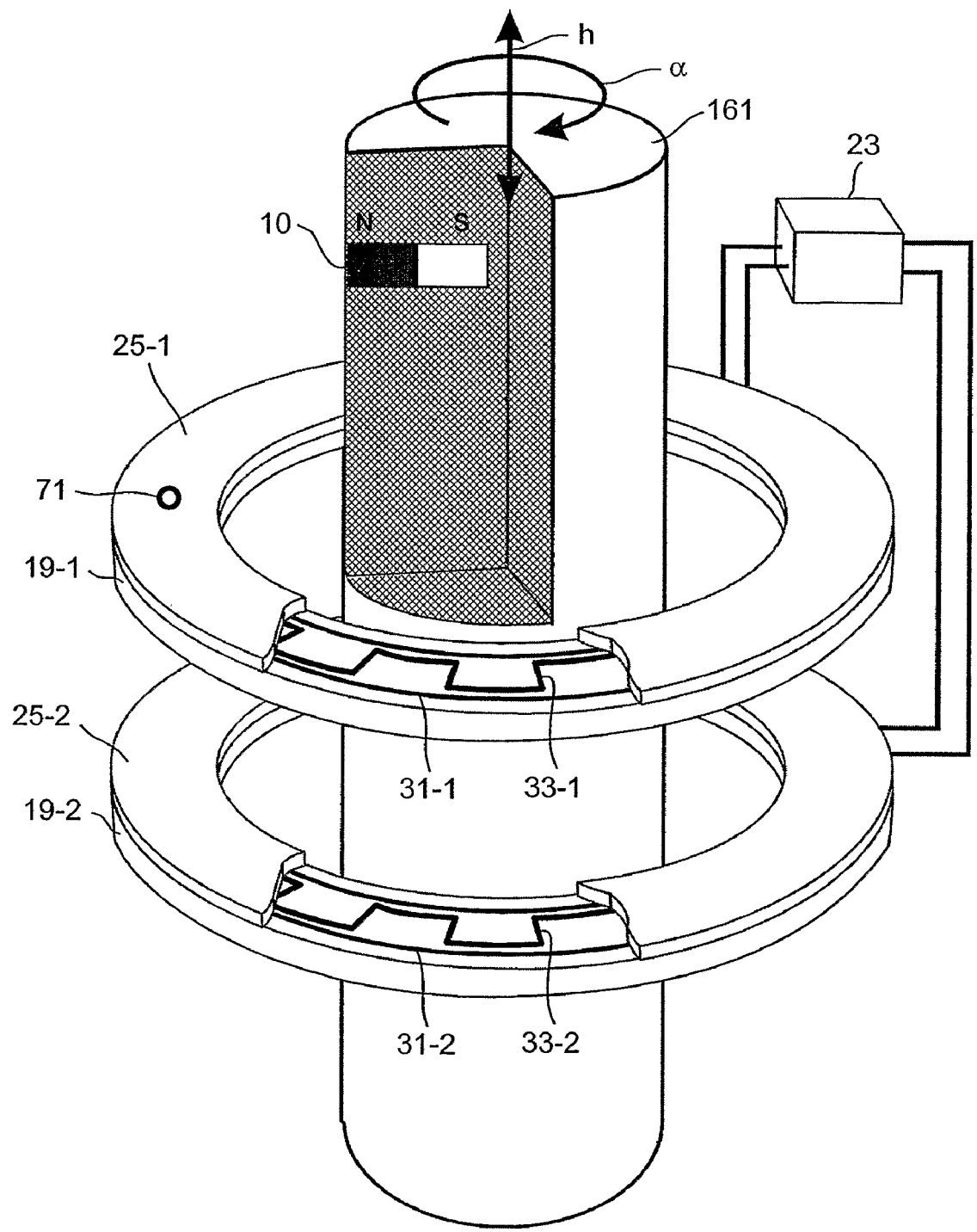
Figure 19:
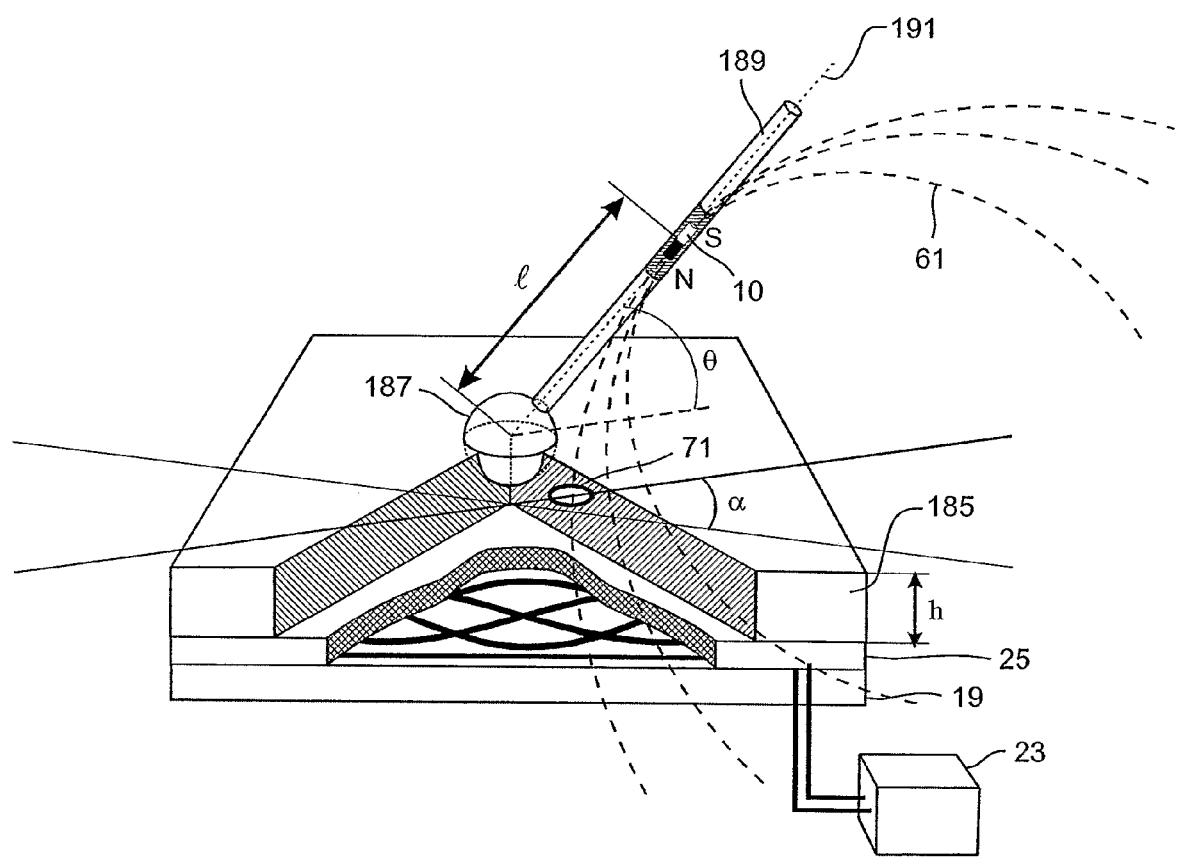

FIG. 7b schematically illustrates the geometric form of another multi-period sensor winding which may be used to resolve a period ambiguity associated with the sensor windings shown in FIG. 7a;

FIG. 8 schematically illustrates the way in which a two dimensional position encoder may be formed from sensor windings which are superimposed on top of each other and which extend in X and Y directions;

FIG. 9 schematically illustrates the geometric form of an alternative set of windings that can be used to provide a two-dimensional inductive position sensor;

FIG. 10a schematically illustrates the way in which an inductive position sensor embodying the present invention can be used to provide an angular position encoder for encoding the rotation angle of a shaft;

FIG. 10b schematically illustrates an alternative form of angular position encoder embodying the present invention;

FIG. 11 schematically illustrates an alternative form of angular position encoder embodying the present invention;

FIG. 12 schematically illustrates the form of another angle position encoder embodying the present invention;

FIG. 13 schematically illustrates the form of another angle position encoder embodying the present invention;

FIG. 14 schematically illustrates the form of another angle position encoder embodying the present invention;

FIG. 15 schematically illustrates the form of another angle position encoder embodying the present invention;

FIG. 16 schematically illustrates an angle and height position encoder embodying the present invention;

FIG. 17 schematically illustrates another angle and height position encoder embodying the present invention;

FIG. 18 schematically illustrates another angle and height position encoder embodying the present invention; and FIG. 19 schematically illustrates a joystick type position encoder embodying the present invention.

DETAILED DESCRIPTION OF THE INVENTION

Overview

Figure 1:
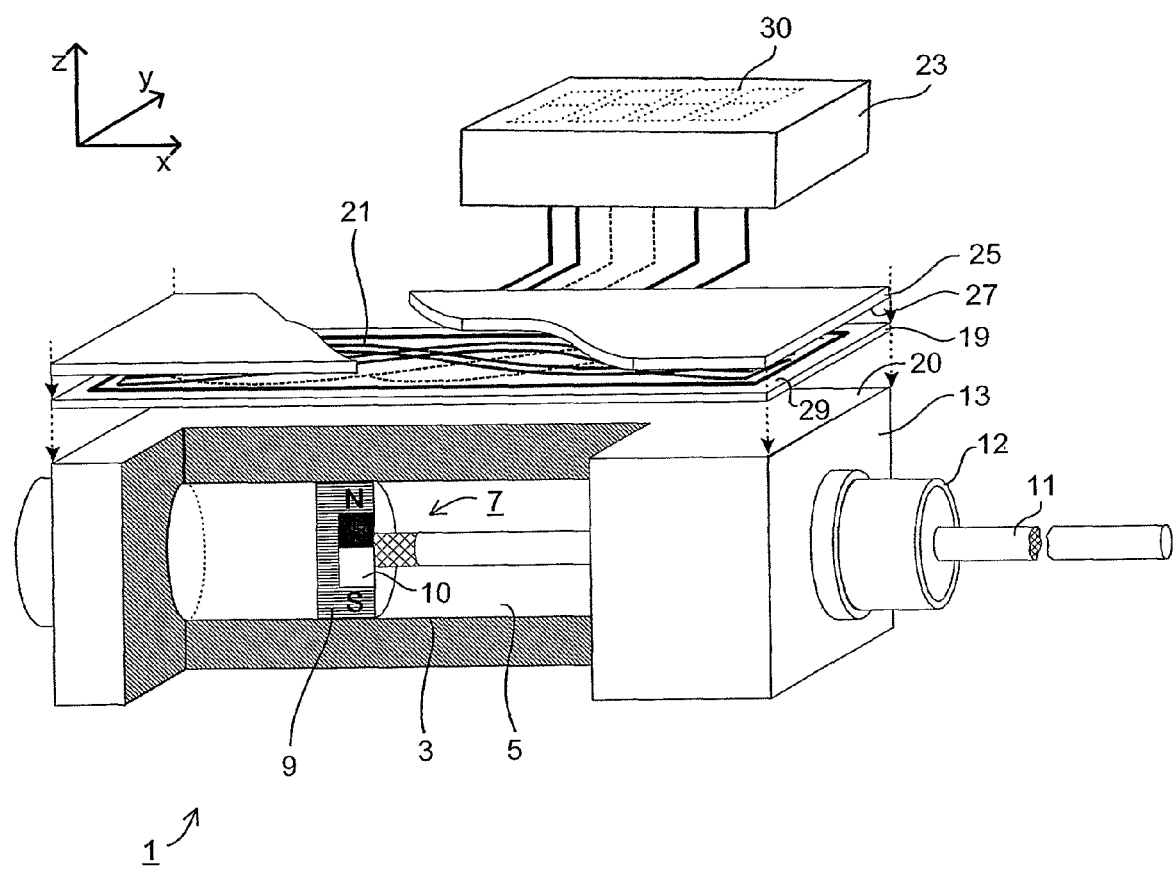

FIG. 1 schematically illustrates an exploded view of a piston and cylinder assembly 1 which includes an inductive sensor system embodying the present invention. As shown, the assembly 1 comprises an elongate cylinder 3 having a central bore 5 in which a piston 7 is reciprocally mounted. The piston 7 includes a piston head 9 whose outer diameter corresponds to the inner diameter of the cylinder bore 5. As shown, the piston head 9 includes a DC magnet 10 oriented with the north and south poles being aligned vertically in the Figure (i.e. in the Z direction). The movement of the piston 7 within the cylinder 3 is controlled by an actuating member (not shown) which applies force to the end 11 of the piston 7 which extends from the right hand end 12 of the cylinder 3. The cylinder 3 is encased within a metal casing 13 part of which is cut away to show the cylinder 3 and the piston 7.

In this embodiment, a printed circuit board (PCB) 19 is attached to an upper surface 20 of the cylinder housing 13. In this embodiment, the PCB 19 has a width in the Y direction of 20 mm and a length in the X direction of 300 mm (which approximately corresponds to the range over which the piston head 9 can travel within the cylinder 3). The PCB 19 carries a number of conductive tracks 21 which are connected together to define a number of excitation and sensor windings (not shown) which are connected to excitation and processing electronics 23.

In this embodiment, a film 25 of magnetisable material is provided having its lower principal surface 27 fixed to the upper surface 29 of the PCB 19. In this embodiment, the film 25 of magnetisable material is $Ni_{80\%}Fe_{20\%}$, which is a soft ferromagnetic material having a high initial and maximum permeability (100,000 to 400,000) a low coercivity and a relatively low saturation field (1 A/m) and polarisation (0.7 T to 0.9 T). In this embodiment, the film 25 has a thickness in the Z direction of less than 0.2 mm. As shown in FIG. 1, the film 25 of magnetisable material has approximately the same width and length as the PCB 19.

In this embodiment, the excitation and sensor windings carried by the PCB 19 are geometrically arranged on the PCB 19 so that, in the absence of the piston 7, there is substantially no electromagnetic coupling between them. In other words, in the absence of the piston 7, when an AC excitation current is applied to the excitation winding, substantially no signal is induced in the or each sensor winding. Additionally, the film 25 of magnetisable material is substantially homogenous so that, in the absence of the magnet 10, its presence adjacent to the excitation and sensor windings does not affect the balance between the windings. However, when the piston 7 is present, the magnet 10 within the piston head 9 creates a positionally varying DC magnetic field which penetrates through the metallic cylinder casing 13 and the PCB 19 and interacts with the portion of the film 25 that is, in this embodiment, directly above the magnet 10. The interaction of the DC magnetic field with this portion of the film 25 creates an imbalance between the excitation and sensor windings such that when the AC excitation current is applied to the excitation winding, AC signals are generated in the or each sensor winding The excitation and the sensor windings are geometrically arranged on the PCB 19 so that this imbalance varies with the position of the piston 7 within the cylinder 3. As a result, when the AC excitation signal is applied to the excitation winding, the signal generated in the or each sensor winding varies with the position of the piston 7 within the cylinder 3. Therefore, by suitable processing of the signals generated in the or each sensor winding, the processing electronics 23 determines and outputs (e.g. on display 30) a value indicative of the position of the piston 7 within the cylinder 3.

An overview has been given above of the way in which a novel inductive position encoder is used to encode the position of a piston 7 within a cylinder 3. The system described above offers a number of advantages over the prior art type sensors described in the introduction of this application. One of the main advantages is that the position encoder is able to continuously sense the position of the piston 7 within the cylinder 3 using excitation and sensor windings which are mounted on the outside of the metallic cylinder casing 13. This is a significant advantage over the known inductive sensing systems that can continuously sense the position of a piston 7 within a cylinder 3. In particular, with the prior art continuous sensing systems, the piston 7 usually carries an AC magnetic field generator the field from which cannot penetrate through the metallic cylinder casing 13. Therefore, the sensor windings used in such prior art continuous inductive position encoders have to be mounted on the inside wall of the cylinder 3.

A more detailed description will now be given of the components of the sensor system shown in FIG. 1 together with an explanation of how the inventor believes the sensor system is working.

Sensor PCB

FIG. 2a schematically illustrates the conductor tracks on the sensor PCB 19 which form the excitation winding 31 and a "sin" sensor winding 33, both of which extend along the length of the PCB 19. In this embodiment, the PCB 19 is a two layer PCB, with the conductor tracks on the upper layer (closest to the film 25) being shown in solid lines and with the conductor tracks on the lower layer (closest to the piston 7) being shown in dashed lines. In this embodiment, the sensor winding 33 has a pitch ($L_x$) which corresponds to the range over which the piston 7 can move within the cylinder 3. In this embodiment, the pitch ($L_x$) is 280 mm. As shown in FIG. 2a, the ends of the excitation winding 31 are connected to the excitation and processing electronics 23 (which are also mounted on the PCB 19) at the connection pads 37-1 and 37-2. Similarly, the ends of the sensor winding 33 are connected to the excitation and processing electronics 33 at connection pads 39-1 and 39-2. In this embodiment, the sin sensor winding 33 is formed from two turns of conductor which effectively define two sets of loops 35-1 and 35-2 which are connected together in the opposite sense in a figure of eight configuration. As a result, EMFs induced in the first set of loops 35-1 by a common background magnetic field will oppose the EMFs induced in the second set of loops 35-2 by the same common background magnetic field.

In this embodiment, the excitation winding 31 is wound around the outside of the sensor winding 33 and is arranged so that (in the absence of the magnet 10) when an AC excitation current is applied across its ends by the excitation and processing electronics 23, an AC excitation magnetic field is generated which extends predominantly in the Z direction shown in FIG. 1. The excitation magnetic field that is generated by passing an excitation current through the excitation winding 31 will be substantially symmetric along an axis which is parallel to the Y axis and which passes through the middle of the excitation winding. This axis of symmetry is also an axis of symmetry for the sensor coil 33. Therefore, as a result of the figure of eight arrangement of the sensor winding 33 and as a result of the common symmetry between the excitation winding 31 and the sensor winding 33 any EMF induced in the first set of loops 35-1 by the excitation magnetic field will be opposed by the EMF induced in the second set of loops 35-2 by the excitation magnetic field. Therefore, in this embodiment, in the absence of the magnet 10, there is minimal direct coupling between the excitation winding 31 and the sensor winding 33.

FIG. 2b schematically illustrates other conductive tracks on the sensor PCB 19 which form a "cos" sensor winding 41. As those skilled in the art will appreciate, the cos winding 41 is effectively formed by shifting the sin winding 33 shown in FIG. 2a by quarter of the pitch ($L_x$) along the X direction shown in FIG. 1. As shown in FIG. 2b, the ends of the cos sensor winding 41 are connected to the excitation and processing electronics at connection pads 40-1 and 40-2. In this embodiment, cos sensor winding 41 effectively defines three sets of loops 43-1, 43-2 and 43-3, with the loops of the first and third sets being wound in the same direction as each other but opposite to the winding direction of the loops of the second set 43-2. As with the sin sensor winding 33, the size of the loops forming the cos sensor winding 41 are chosen so that (in the absence of the magnet 10) the EMFs induced in the first and third sets of loops 43-1 and 43-3 by the excitation magnetic field cancel with the EMFs induced in the second set of loops 43-2 by the excitation magnetic field. Therefore, in this embodiment, there is also minimal direct coupling between the excitation winding 31 and the cos sensor winding 41.

However, as mentioned above, when the piston 7 is in the cylinder 3, the DC magnet 10 creates a positionally varying magnetic field that interacts with the film of magnetisable material to create an imbalance between the excitation winding 31 and the sensor windings 33 and 41. As a result of the geometrical variation of the sensor windings 33 and 41 along the X direction, the imbalance that is created by the magnet 10 and the film 25 depends upon the position of the magnet 10 along the X direction relative to the sensor windings 33 and 41. Therefore the signal generated in each sensor winding 33 and 41 will vary with the position of the piston 7 within the cylinder 3. As a result of the figure of eight configuration of the sensor windings 33 and 41, the variation of the signal generated in each sensor winding 33 and 41 is approximately sinusoidal. In fact, in this embodiment with an AC excitation signal, the signal generated in each sensor winding 33 and 41 is an AC signal at the same frequency as the excitation signal applied to the excitation winding 31, whose peak amplitude varies approximately sinusoidally with the position of the piston 7 within the cylinder 3. The signals generated in each sensor winding are at the same frequency as the excitation frequency because, in this embodiment, the direction and magnitude of the AC excitation magnetic field (generated by the AC current flowing in the excitation winding 31) is such that it does not saturate the film 25 of magnetisable material in the vicinity of the sensor windings.

Figure 3A:
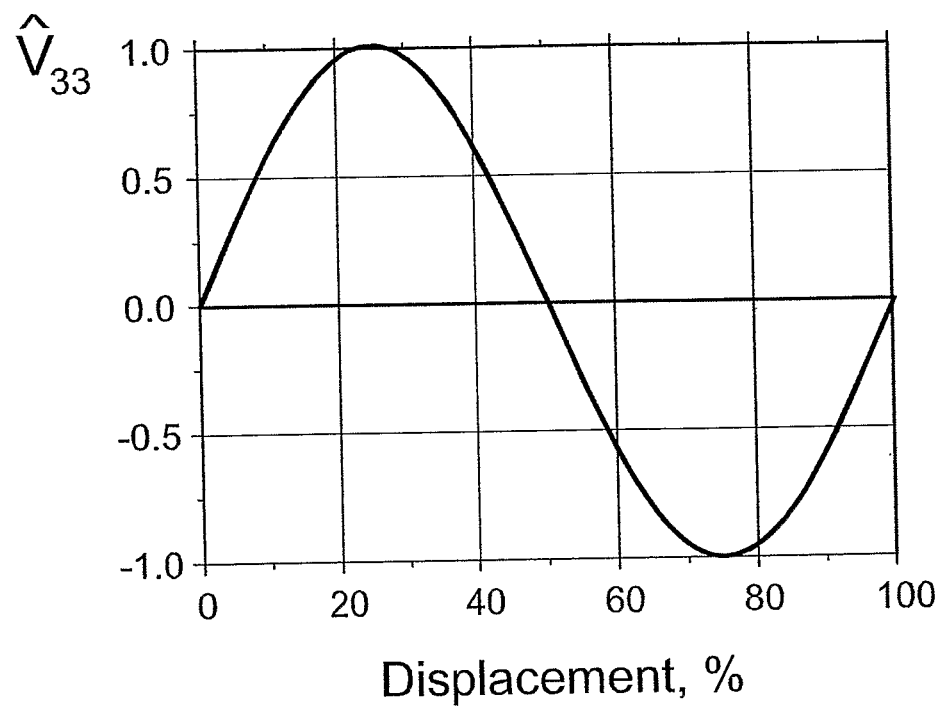
FIG. 3a is a plot illustrating the way in which the peak amplitude of a signal generated in the sin sensor winding shown in FIG. 2a varies with the position of the piston within the cylinder.

FIG. 3a schematically illustrates the way in which the peak amplitude of the signal generated in sensor winding 33 varies with the position of the piston 7 within the cylinder 3. As shown, the variation in peak amplitude is approximately sinusoidal and hence the sensor winding 33 is referred to as the "sin" sensor winding 33. The period of the sinusoidal variation corresponds to the pitch ($L_x$) of the sensor winding 33 and therefore, the peak amplitude of the signal induced in sensor winding 33 can be represented by:

$$\hat{V}_{33} = A_0 \sin\left[\frac{2\pi x}{L_x}\right]$$

Where x is the unknown position of the piston 7 within the cylinder 3; $L_x$ is the pitch of the sensor winding 33 and $A_0$ is a coupling coefficient.

Figure 3B:
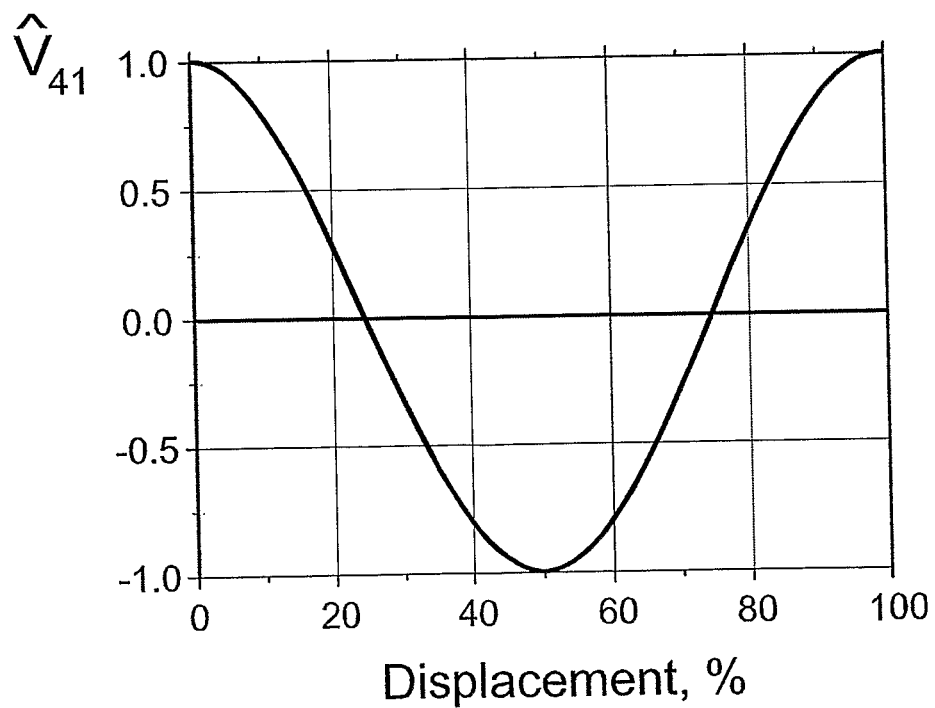
FIG. 3b is a plot illustrating the way in which the peak amplitude of a signal generated in the cos sensor winding shown in FIG. 2a varies with the position of the piston within the cylinder.

FIG. 3b schematically illustrates the way in which the peak amplitude of the signal induced in sensor winding 41 varies with the position of the piston 7 within the cylinder 3. As shown, the variation is in phase quadrature to the variation obtained from sensor winding 33, which is why the sensor winding 41 is referred to as the "cos" sensor winding. As those skilled in the art will appreciate, the quadrature nature of the variation between the signals output from the sensor windings 33 and 41 is obtained because sensor winding 41 is effectively shifted along the X direction by a quarter of the pitch $L_x$ relative to sensor winding 33. Therefore, the peak amplitude of the signal induced in sensor winding 41 can be represented by:

$$\hat{V}_{41} = A_0 \cos\left[\frac{2\pi x}{L_x}\right]$$

As those skilled in the art will appreciate, the plots shown in FIG. 3 are approximate in that the peak amplitudes of the output signals do not vary exactly sinusoidally with the position of the piston 7 within the cylinder 3. This is an approximation to the actual variation which will depend upon edge effects, positions of via holes and other effects which introduce non-linearities into the system.

As those skilled in the art will appreciate, two sensor windings 33 and 41 are provided in this embodiment in order to be able to uniquely encode the position of the piston 7 within the cylinder 3 along the entire pitch ($L_x$) of the sensor windings 33 and 41. However, if the measurement range of the piston 7 within the cylinder 3 is limited, for example to between the thirty percent and the seventy percent points on the plot shown in FIG. 3a, then only one sensor winding (winding 33) would be required to determine the absolute position of the piston 7 within the cylinder 3. However, when the piston 7 can move over the entire pitch of the sensor windings 33 and 41, at least two sensor windings are required in order to overcome the phase ambiguity common with sinusoidal signals. For example, if the peak amplitude of the signal generated in sensor winding 33 is determined to be 0.5, then, as shown in FIG. 3a, the position may correspond to approximately ten percent or approximately forty-two percent of the range of movement of the piston 7 within the cylinder 3. This ambiguity can be resolved using, the peak amplitude of the signal generated in the second sensor winding 41.

As will be described in more detail below, in this embodiment, the excitation and processing electronics 23 determines the position of the piston 7 within the cylinder by taking an inverse arc tangent function of the ratio of the peak amplitudes of the signals induced in sensor windings 33 and 41. The use of such a ratiometric calculation is preferred as it removes the common amplitude factor ($A_0$) from the calculations, thereby making the system less sensitive to variations in the amplitude of the excitation current and variations in the distance between the magnet 10 and the film 25 of magnetisable material.

Understanding of Operation

Figure 4:
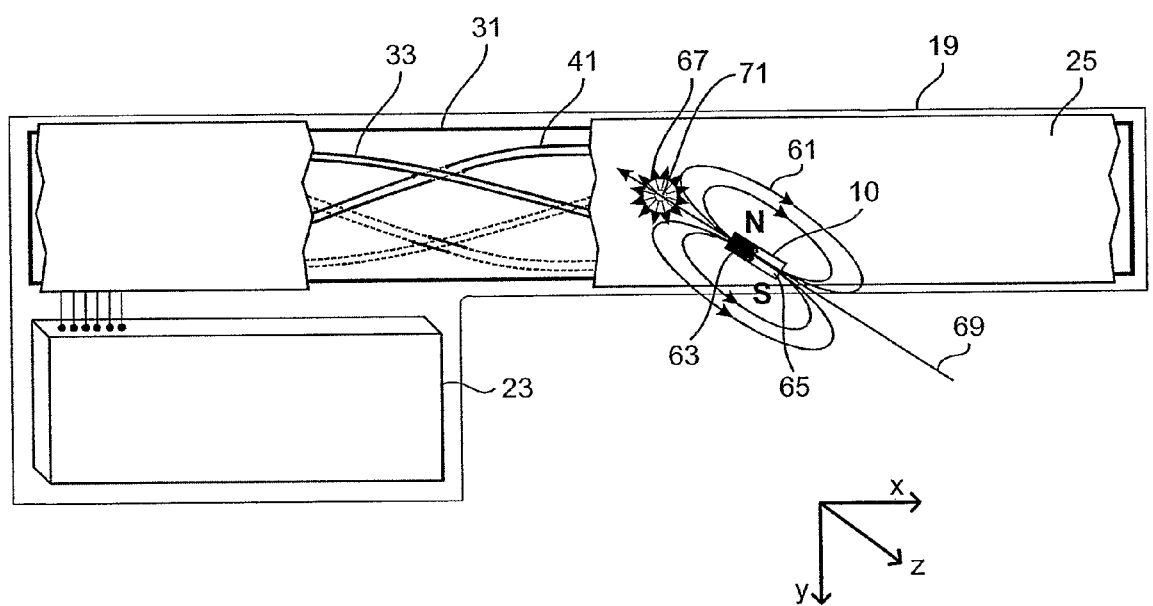
FIG. 4 shows the excitation and sensor windings, a film of magnetisable material and a magnet which moves along the X direction with the movement of the piston and illustrating a spot on the film of magnetisable material corresponding to a magnetic null of the DC magnetic field generated by the magnet.

A description will now be given of the way in which the inventor believes that the system is operating. FIG. 4 is a plan view showing the PCB 19 with the film 25 of magnetisable material overlaid on top of the PCB 19 and cut away to reveal part of the excitation winding 31 and the sensor windings 33 and 41. FIG. 4 also schematically shows the excitation and processing circuitry 23 and the magnet 10 which is mounted in the piston (not shown).

DC Magnetic Field Interaction

FIG. 4 schematically shows the field lines 61 of the DC magnetic field generated by the magnet 10. As shown, the field lines 61 are directed from the north pole 63 of the magnet 10 to the south pole 65 and all magnetic field lines are closed. In this embodiment, the strength of the DC magnetic field 61 generated by the magnet 10 is approximately 10 kA/m. As those skilled in the art will appreciate, the magnet 10 must be positioned close enough to the film 25 of magnetisable material to saturate the portion 67 immediately adjacent the magnet 10. As the strength of the DC magnetic field 61 reduces with the cube of the distance from the DC magnet 10, the DC magnet 10 should be positioned between 0.1 mm and 80 mm from the film 25 in order that it can saturate the film 25. In this embodiment, the DC magnet 10 is approximately 10 mm from the film 25 of magnetisable material.

The magnetic field 61 that is generated by the magnet 10 has two components, one which is directed perpendicular to the film 25 of magnetisable material and the other which is directed "in the plane" of the film 25 of magnetisable material. The component which is perpendicular to the film 25 of magnetisable material does not interact with the film 25. The other "in plane" component does interact with the film 25 and, depending on its magnitude, can magnetically saturate the film 25. Therefore, at the spot 71 where the DC magnetic field 61 generated by the DC magnet is perpendicular to the film 25, no saturation of the film 25 occurs. In this embodiment, with the orientation of the magnet 10 shown in FIG. 1, this spot 71 is located where the magnetic axis 69 of the DC magnet 10 intersects with the film 25 of magnetisable material. However, surrounding the spot 71 of unsaturated film, the magnetic field 61 generated by the DC magnet includes in-plane components which saturate the magnetisable material within the portion 67 immediately adjacent the magnet 10. The size of the portion 67 depends on the distance between the magnet 10 and the film 25 of magnetisable material and the strength of the DC magnetic field 61.

Figure 5A:
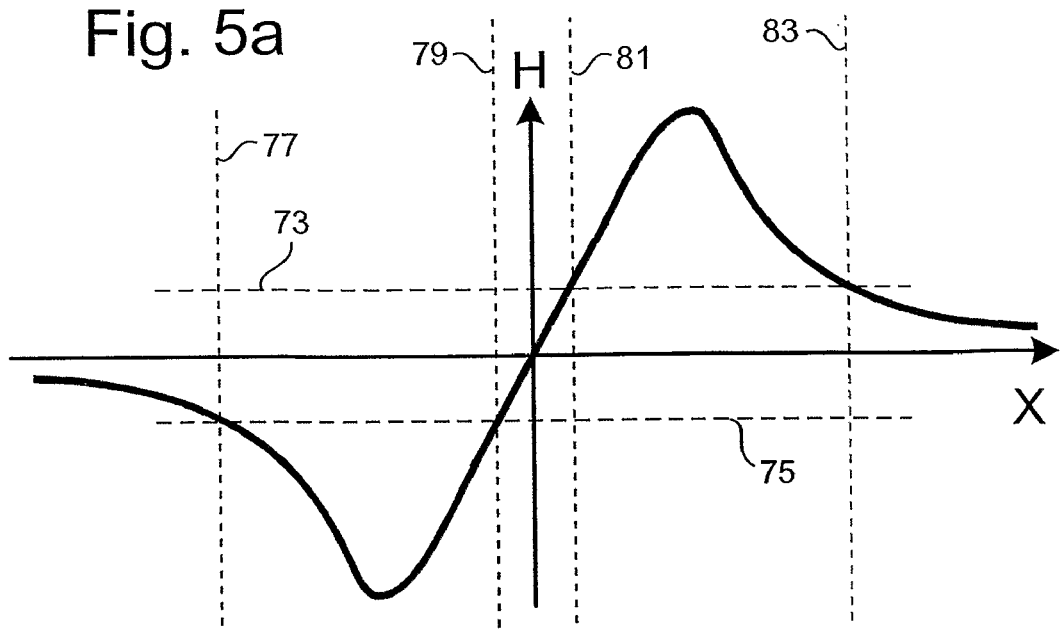
FIG. 5a is a plot illustrating the way in which the strength of an in-plane component (H) of the DC magnetic field generated by the magnet varies with position along the X direction.
Figure 5B:
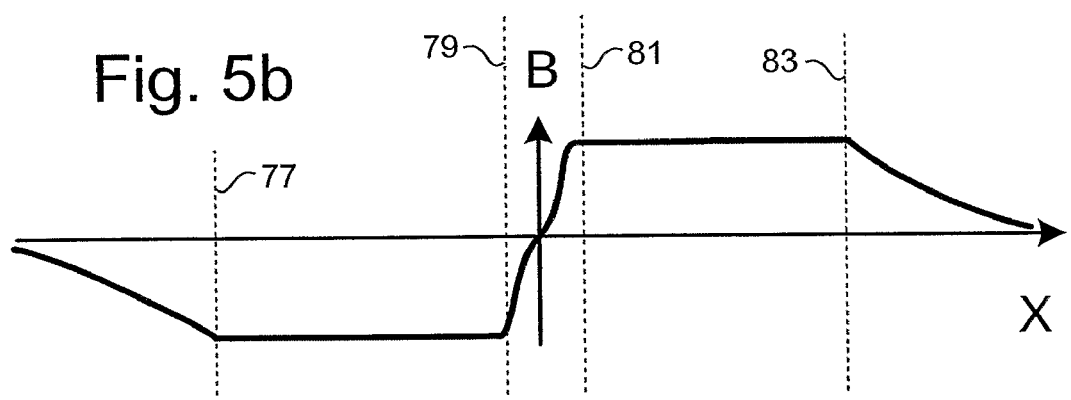
FIG. 5b is a plot illustrating the way in which the magnetic flux density (B) within the film of magnetisable material varies with position along the X-direction.

FIG. 5a is a plot showing the way in which the strength of the in-plane component (H) of the DC magnetic field 61 varies along the X direction through the centre of the spot 71 (which corresponds to the origin of the plot). As shown, the in-plane component (H) is zero in the centre of the spot 71 and is negative on the left hand side of the origin and is positive on the right hand side of the origin. The horizontal lines 73 and 75 shown in the plot corresponds to the strength of the magnetic field required to saturate the film 25 of magnetisable material. As shown, between vertical lines 77 and 79 and between vertical lines 81 and 83 the in-plane component (H) of the magnetic field is strong enough to saturate the film 25 of magnetisable material. This is illustrated in FIG. 5b which shows the way in which the magnetic flux density (B) within the film 25 of magnetisable material varies along the X direction taken through the centre of the spot 71. As shown, between vertical lines 77 and 79 and between vertical lines 81 and 83, the magnetic flux density within the film 25 is constant where the film 25 is saturated. Therefore, the width of the portion 67 of the film 25 that is saturated corresponds to the distance between vertical lines 77 and 83.

However, between vertical lines 79 and 81 shown in FIG. 5a, the in-plane component (H) of the magnetic field is not strong enough to saturate the film 25. Therefore, the spot 71 of the film 25 that is not saturated has a width corresponding to the distance between vertical lines 79 and 81 shown in FIG.

5a. As those skilled in the art will appreciate, the distance between vertical lines 77 and 83 and the distance between vertical lines 79 and 81 shown in FIG. 5a will depend on the magnetic field strength of the DC magnetic field 61 and on the magnetic properties of the film 25 of magnetisable material.

Figure 5C:
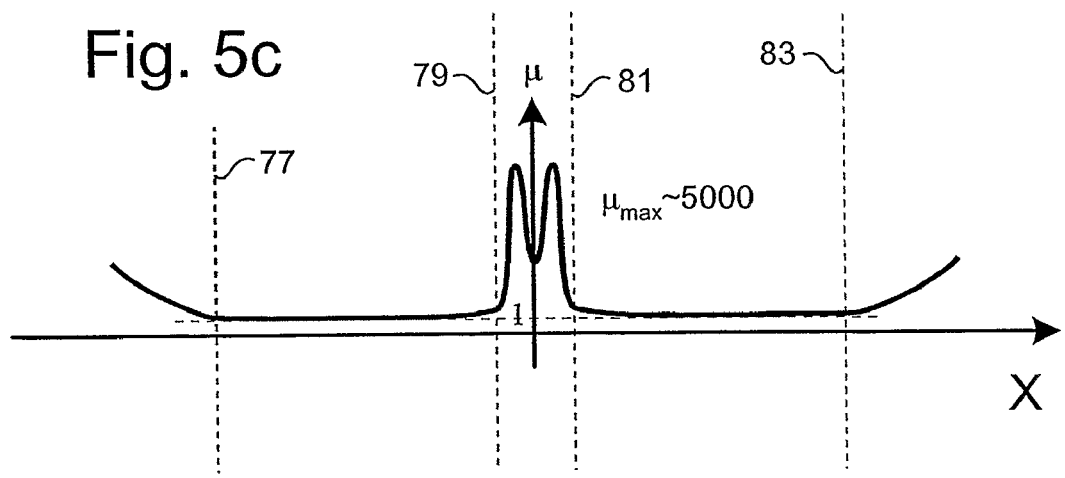
FIG. 5c is a plot illustrating the way in which the permeability of the film of magnetisable material varies with position along the X-direction.

FIG. 5c is a plot illustrating the way in which the AC relative permeability (μ) varies along the X direction through the centre of the spot 71. As shown, between vertical lines 77 and 79 and between vertical lines 81 and 83, the relative permeability is approximately one where the magnetisable material has become fully saturated. However, within the spot 71 between vertical lines 79 and 81, the film 25 of magnetisable material is not saturated and because of the large rate of change of the in-plane magnetic field (H), the relative permeability within the spot 71 increases rapidly. The maximum permeability within the spot 71 depends on the material properties of the film 25. With the magnetisable material used in this embodiment, the maximum relative permeability is approximately 5000. In contrast, to the left of vertical line 77 and to the right of vertical line 83 (where the film 25 becomes unsaturated), the relative permeability increases more gradually compared with inside the spot 71. This is because the rate at which the in-plane magnetic field component (H) is changing is much lower at these positions of the film 25. As there is a rapid change of permeability of the film 25 within the spot 71, the spot 71 will sometimes be referred to hereinafter as the in-homogeneity spot 71.

AC Magnetic Field Interaction

As discussed above, the excitation and processing electronics 23 drives the excitation winding 31 with an AC excitation current having a peak amplitude of 50 mA. This AC excitation current generates an AC excitation magnetic field which, in the vicinity of the sensor windings 33 and 41, is predominantly directed in the Z direction (i.e. perpendicular to the film 25 of magnetisable material). However, as those skilled in the art will appreciate, the AC excitation magnetic field immediately adjacent to the excitation winding 31 will include components in the X and Y directions which will change the permeability of the film 25 at the same frequency as the excitation current by saturating the film 25 of magnetisable material. However with a 50 mA excitation current, only an area of about 1 mm around the excitation winding 31 will be saturated by the AC excitation magnetic field. The remainder of the film 25 of magnetisable material will not be saturated by the AC excitation magnetic field because of its direction and magnitude.

This AC excitation electromagnetic field induces eddy currents on the surface of the film 25. In an homogenous film, the eddy currents effectively cancel each other out in the centre of the film and follow a path on the surface that corresponds to the path of the excitation winding 31, although in a direction that opposes the current flow in the excitation winding 31. However, with a film having an in-homogeneity spot 71, eddy currents are also effectively trapped around the spot. The eddy currents that are induced on the surface of the film 25 generate their own magnetic field which then couple back into the sensor windings 33 and 41. The eddy currents that follow a path corresponding to the path of the excitation winding 31 will generate (in theory) a magnetic field that is symmetric like the excitation magnetic field and that will not, therefore, couple with the balanced sensor windings 33 and 41. However, the eddy currents that are effectively trapped by the in-homogeneity spot 71 will create an electromagnetic field which is concentrated at the position of the in-homogeneity spot 71. Therefore, in view of the geometrical variation of the sensor windings 33 and 41 along the measurement path, the coupling of the electromagnetic field generated by these trapped eddy currents with the sensor windings 33 and 41 will depend on the relative position between the sensor windings 33 and 41 and the position of the in-homogeneity spot 71. As the position of the in-homogeneity spot 71 varies with the position of the piston 7 within the cylinder 3, the signals induced in the sensor windings 33 and 41 by these trapped eddy currents also vary with the position of the piston 7 within the cylinder 3.

Frequency Selection

As mentioned above, the eddy currents that effectively follow a path corresponding to the path of the excitation winding 31 will not, in theory, generate an electromagnetic field that will couple with the sensor windings 33 and 41. This is likely to be true for a film 25 of magnetisable material that is much larger in dimensions than the excitation winding 31. However, in this embodiment, the film 25 has approximately the same dimensions as the PCB 19. There may, therefore, be edge effects in the material that results in slight in-homogeneities in the film at the edges. These will create an unwanted noise signal in the sensor windings. However, the inventor has found that for a given material of film 25 and a given width of excitation winding 31, it is possible to choose an excitation frequency that minimises these edge effects. The reason for this will now be explained.

As is well know, when eddy currents are induced in the surface of a material, they penetrate into the material to a depth (known as the skin depth) that depends on the properties of the material (including the permeability) and the frequency of the excitation field. More specifically, eddy currents are induced deeper into the material in regions where the permeability of the material is lower. Similarly, eddy currents are also induced deeper into the material when the excitation frequency is lower. Additionally, the phase of the eddy currents that are induced changes with depth within the material. Therefore, the inventor has realised that it is possible to select an excitation frequency for a given material of the film 25, so that the eddy currents that follow the path of the excitation winding 31 (at the edge of the film 25) create electromagnetic fields which cancel each other out due to the phase difference between the different eddy currents. However, because the eddy currents that are trapped by the in-homogeneity spot 71 do not penetrate as far into the material, and because the linear size of the in-homogeneity spot 71 is substantially dissimilar to the width of the excitation winding 31, their phases differ to a lesser degree and so their electromagnetic fields do not cancel. With the particular film 25 of magnetisable material that is used in this embodiment, the inventor found that the appropriate excitation frequency was approximately 500 kHz.

Excitation and Processing Electronics

Figure 6:
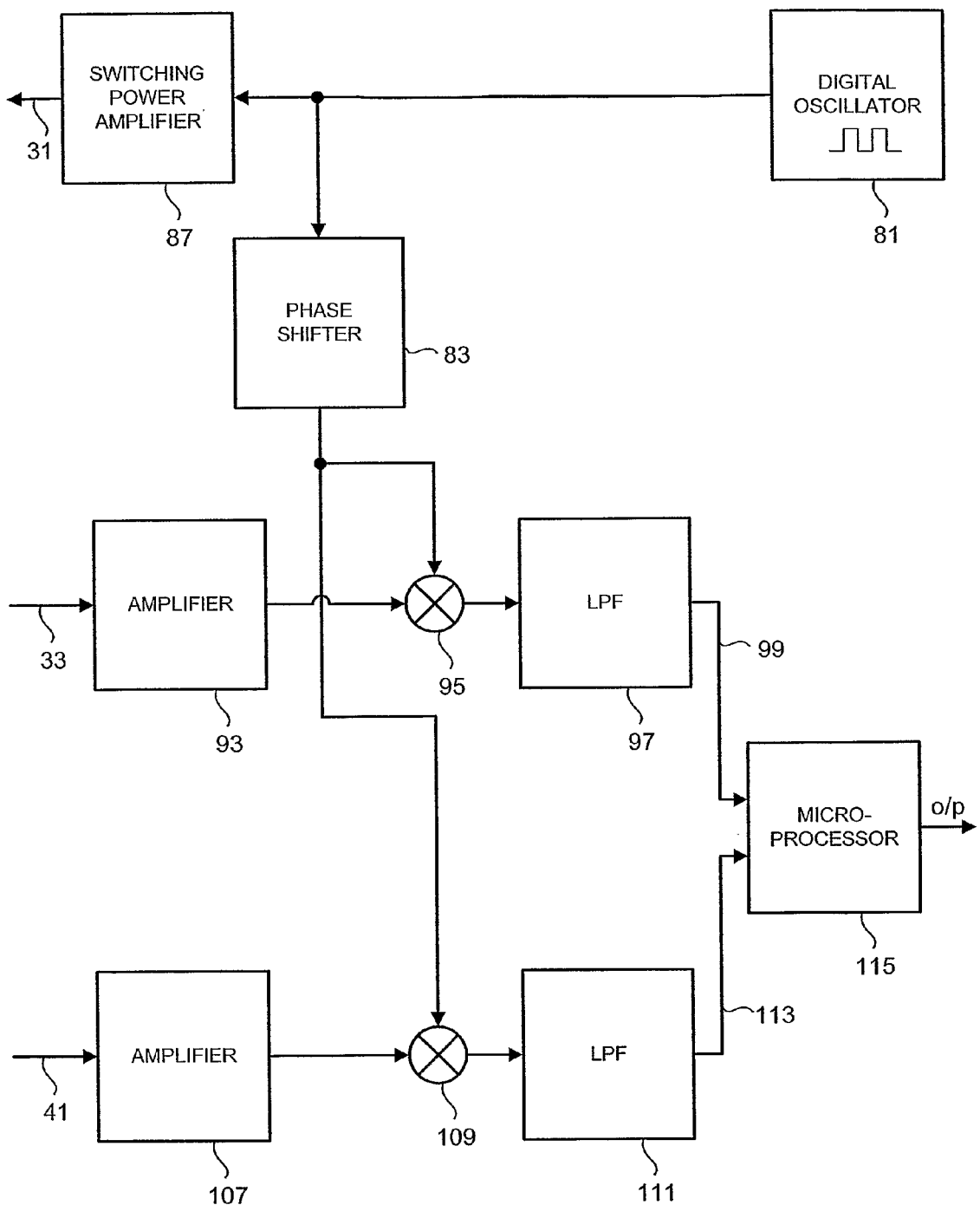
FIG. 6 is a block diagram illustrating the main components of the excitation and processing circuitry used in this embodiment to drive the excitation winding and to process the signals from the sensor windings to determine the position of the piston within the cylinder.

FIG. 6 is a block diagram illustrating the main components of the excitation and processing electronics 23 used in this embodiment to excite the excitation winding 31 and to process the signals induced in the sensor windings 33 and 41. As shown, in this embodiment, the excitation signal is generated by a digital oscillator 81 which outputs a square wave voltage having a predetermined frequency which in this embodiment is 500 kHz. As shown, the square wave voltage output from the oscillator 81 is applied to a switching and power amplifier 87 which amplifies the excitation voltage to generate an excitation current which is applied to the excitation winding 41. As mentioned above, in this embodiment, the peak amplitude of the excitation current is 50 mA.

As shown in FIG. 6, the signal generated in sensor winding 33 is amplified by the amplifier 93 and is then passed to a mixer 95. As discussed above, the signal generated in sensor winding 33 is an AC signal at the same frequency as the excitation current that is applied to the excitation winding 41, with the desired piston position information being modulated onto the peak amplitude of the received signal. The mixer 95 is therefore used to demodulate the received signal to extract the position information from the sensor signal. The mixer 95 achieves this demodulation by multiplying the signal output from the amplifier 93 with a phase shifted version of the excitation signal that is generated by the phase shifter 83 from the output of the digital oscillator 81. The phase shift is required to try to match the phase of the mixing signal with the phase of the sensor signals that are induce in the sensor windings 33 and 41 by the eddy currents trapped by the in-homogeneity spot 71. The phase shift that is required depends on the material of the film 25 and the excitation frequency used. In this embodiment, with the particular film 25 that is used and with the chosen excitation frequency, the phase shift required is approximately ninety degrees.

The output from the mixer 95 will include a DC value corresponding to the peak amplitude of the sensor signal (which as discussed above sinusoidally varies with the position of the piston 7) and higher frequency mixing products. The mixed signal is then filtered by the low pass filter 97 which removes the high frequency mixing products. As shown in FIG. 6, the signal from sensor winding 41 is also processed in a similar way through amplifier 107, mixer 109 and low pass filter 111.

The filtered DC values 99 and 113 (corresponding to the peak amplitudes of the signals induced in sensor windings 33 and 41) are then passed to a microprocessor 115, for use in determining the position of the piston 7 within the cylinder 3. As mentioned above, in this embodiment, the microprocessor 115 determines the position of the piston 7 within the cylinder 3 by taking an inverse tangent function of the ratio of filtered DC value 99 and filtered DC value 113. This gives a measure of:

$$\left[\frac{2\pi x}{L_x}\right]$$

Therefore, as the pitch ($L_x$) of the sensor windings 33 and 41 is known, the microprocessor 115 can determine the unknown position (x) of the piston 7 within the cylinder 3. Additionally, by tracking the determined value of x, the microprocessor 115 can determine the direction in which the piston 7 is moving, its speed and acceleration etc. In this embodiment, the microprocessor 115 outputs the determined measurements for display on the display 30.

Alternative Embodiments

In the above embodiment, an inductive position encoder was provided for sensing and for outputting a value indicative of the position of a piston 7 within a cylinder 3. The inductive position encoder employed sensor windings 33 and 41 having a pitch corresponding to the range over which the piston 7 can move within the cylinder 3. As those skilled in the art will appreciate, the range over which position measurements can be made can be varied by varying the pitch of the or each sensor winding. However, as the pitch of the sensor windings are increased the resolution with which the position of the piston 7 can be encoded decreases. FIG. 7a schematically illustrates the form of an excitation winding 31 and quadrature sensor windings 151 and 153 that may be used to main- tain position sensing resolution whilst doubling the measurement range (in this case along the Y direction). Although not shown in FIG. 7a, the PCB 19 and processing electronics 23 would be used in combination with the film 25 of magnetisable material and the DC magnet 10 mounted in the object whose position is to be encoded.

As shown in FIG. 7a, in this embodiment, the sensor windings 151 and 153 are periodic in nature. In particular, in this embodiment, the sensor windings 151 and 153 extend over two pitches ($L_y$) along the measurement range (defined by the length of the PCB 19 in the Y direction). As those skilled in the art will appreciate, this means that the signals output from the sensor windings 151 and 153 will not be able to uniquely determine the position of the magnet over the measurement range. This is illustrated by the plots shown at the bottom of FIG. 7a which show the way in which the peak amplitudes of the signals induced in sensor windings 151 and 153 vary with the position of the magnet 10 along the Y direction. In order to overcome this period ambiguity problem, the processing electronics 23 must either know an initial starting position for the magnet 10 and then track the position of the magnet 10 as it moves or some other technique must be provided to overcome this period ambiguity problem. The applicant's earlier international application WO 95/31696 discusses various techniques to overcome this period ambiguity problem associated with the type of sensor windings shown in FIG. 7a.

The preferred way of overcoming this period ambiguity problem is to provide a second set of quadrature sensor windings similar to the periodic sensor windings 151 and 153 except having a different pitch along the measurement direction. FIG. 7b schematically shows the sensor winding 153 shown in FIG. 7a together with a further sensor winding 155 having a different pitch ($L_y^1$). In particular, in this example, the sensor winding 155 extends for three periods over the measurement range. Although not shown in FIG. 7b, a fourth sensor winding would be required that is preferably in phase quadrature with sensor winding 155. The processing electronics 23 can then use a Vernier type calculation to resolve the period ambiguity problem associated with the multi-period sensor windings 151 and 153.

In the above embodiments, the position encoder was arranged to encode the position of an object (the piston) which can move in one dimension. As those skilled in the art will appreciate a position encoder can be provided for sensing the position of an object that can move in two or more dimensions. FIG. 8 schematically illustrates the form of a PCB 19 that can be used in a two dimensional position encoder. As shown, the sensor board 19 carries the excitation winding 31, a sin sensor winding 157 that extends along the X direction and a similar sin sensor winding 159 that extends along the Y direction. Although not shown in FIG. 8, similar cos sensor windings would preferably be provided extending in the X and Y directions. FIG. 8 also shows the film 25 of magnetisable material that is placed over the PCB 19, with which the DC magnet within the movable object interacts. As those skilled in the art will appreciate, the processing electronics 23 uses the signals from sensor winding 157 and the corresponding quadrature winding (not shown) to determine the position of the object in the X direction and uses the signals from sensor winding 159 and the corresponding quadrature sensor winding (not shown) to determine the Y position of the object. For a 3 dimensional position encoder a further set of sensor windings could be provided that extend along the Z direction.

In the above embodiments, the sensor windings and the excitation winding were arranged so that there was substantially no mutual coupling between the two in the absence of the magnet 10. This was achieved by arranging the sensor windings in a figure of eight pattern with the excitation winding wound around the outside of the sensor windings. However, as those skilled in the art will appreciate, such balance between the excitation and sensor windings can be achieved in a variety of different ways. Additionally, in the above embodiments, the sensor windings were arranged effectively to provide a signal which continuously varied with the position of the object relative to the sensor winding. Again, as those skilled in the art will appreciate, this is not essential.

FIG. 9 schematically illustrates the form of an alternative set of excitation windings 161-1 to 161-5 and an alternative set of sensor windings 163-1 to 163-5 that can be used to provide a two dimensional position measurement. In this embodiment, each excitation winding 161 and each sensor winding 163 is geometrically arranged over the measurement area so that there is substantially no inductive coupling between them. This is achieved because when an AC excitation current is applied to one of the excitation windings 161, an AC magnetic field is generated by the excitation winding 161 which is positive in the region enclosed by the windings of the excitation winding 161 and is negative outside of this region (as all magnetic lines are closed). Therefore, a positive mutual inductance exists between each excitation winding 161 and each sensor winding 163 in the region where the vertical and horizontal windings overlap and a negative mutual inductance exists in the area outside of this overlap region. As the strength of the AC magnetic field decreases with distance from the excitation winding 161, it is possible to arrange each sensor winding 163 and each excitation winding 161 in order to substantially cancel the mutual inductance between them, by adjusting how much they overlap each other.

As in the first embodiment, the presence of the film 25 of magnetisable material (not shown) will not influence the mutual inductive coupling between the excitation windings 161 and the sensor windings 163. However, when the magnet 10 (not shown) is brought down over the excitation windings 161 and the sensor windings 163, the spot 71 where the magnet 10 does not saturate the film 25 imbalances the mutual inductance so that a signal will be generated in a number of the sensor windings 163. The position of the spot 71 relative to the sensor windings 163 can be determined by energising each excitation winding 31 in turn and by detecting the signal levels generated in each sensor winding 33. By considering the different signal levels generated in each sensor winding 163 when the different excitation windings 161 are energised, the processing electronics (not shown) can determine the X-Y position of the magnet 10.

As those skilled in the art will appreciate, in this embodiment, instead of exciting each excitation winding 161 in turn and measuring the signal levels generated in each sensor winding 163, different frequency excitation signals may be simultaneously applied to the excitation windings 161, with the processing electronics being able to process the signals generated in the sensor windings 163 at the different frequencies to obtain the necessary signal strength measurements. The way in which this would be achieved will be familiar to those skilled in the art and will therefore not be described further.

In the above embodiments, the excitation winding and the sensor windings have been arranged along a linear measurement path. As those skilled in the art will appreciate, the excitation winding and the sensor winding(s) may be arranged along any shape of path. FIG. 10a schematically illustrates the way in which the excitation and sensor windings may be arranged along a circular path in order to provide a position encoder for encoding the angular position ($\alpha$) of a rotatable shaft 161. In particular, FIG. 10a shows the PCB 19 which is formed as a circular ring around the rotatable shaft 161. FIG. 10a also shows the film 25 of magnetisable material which is attached to the surface of the PCB 19. As shown by the cut away section of the film 25, the PCB 19 carries the excitation winding 31 and one or more sensor windings 33, which are connected to the processing electronics 23. FIG. 10a also shows a plate 163 that is mounted for rotation with the shaft 161. Part of the plate 163 is cut away to reveal a magnet 10 which is positioned over the film 25 of magnetisable material and the PCB 19.

The operation of this embodiment is the same as the first embodiment described above (except that the measurement path is circular) and therefore, a detailed description will not be given. However, it should be noted that in this embodiment multi-period quadrature sensor windings 33 are preferably used with appropriate additional sensor windings (not shown) being provided with a different period in order to overcome the period ambiguity problem discussed above. Therefore, by processing the signals generated in the sensor windings 33, the processing electronics 23 can determine the rotational angle ($\alpha$) of the shaft 161 or by tracking the changing rotational angle, the speed or acceleration of the shaft 161. The way in which these calculations would be performed will be apparent to those skilled in the art and will not be described further.

FIG. 10b illustrates an alternative embodiment similar to the embodiment shown in FIG. 10a. The only difference is that in this embodiment, a plurality of DC magnets 10 are provided circumferentially spaced around the plate 163 above the film 25 of magnetisable material and the sensor PCB 19. As shown in FIG. 10b, adjacent magnets are reversed in direction so that there is effectively a magnetic N-S scale circumferentially provided around the plate 163. In order to maximise the signal levels output from the sensor windings 33, the circumferential spacing between the magnets 10 is arranged so that it corresponds with the pitch of the sensor windings 33. In this way, the imbalance caused by each magnet 10 will add together to provide a stronger signal output that varies with the rotational angle ($\alpha$) of the shaft 161. However, this is not essential. Additionally, with this arrangement of magnets it is possible to shorten the length of the sensor PCB 19 and the film 25, so that they only extend over an arc corresponding to the circumferential spacing between the magnets 10.

FIG. 11 schematically illustrates an alternative arrangement of the position encoder for encoding the angular position of a rotatable shaft 161. In this embodiment, the DC magnet 10 is embedded within the shaft 161 oriented with its North-South poles aligned horizontally (i.e. perpendicular to the axis about which the shaft 161 rotates). As shown, a ring PCB 19 is provided around the shaft 161 with the film 25 of magnetisable material 25 attached to the outside of the PCB 19 (relative to the shaft 161). As shown by the cut-away section of the film 25 of magnetisable material, the PCB 19 carries the excitation winding 31 and the sensor windings 33 as before. As those skilled in the art will appreciate, in this embodiment, the DC magnetic field 61 generated by the magnet 10 will interact with the ring of magnetisable material 25 and there will be two diametrically opposed in-homogeneity spots (labelled $R_1$ and $R_2$) where the DC magnetic field 61 is perpendicular to the film 25 of magnetisable material. Provided these two in-homogeneity spots correspond to the same position within one pitch of the sensor windings 33, the two imbalances created by these spots will combine together to provide larger signals output from the sensor windings 33 which vary with the rotational angle ($\alpha$) of the shaft 161. In this embodiment, however, the processing electronics 23 will only be able to encode the angular position of the shaft 161 through one hundred and eighty degrees. Therefore, it will have to track the angular position of the shaft 161 if it can rotate beyond this.

In all of the above embodiments, the DC magnet 10 has been oriented so that its magnetic axis is perpendicular to the film 25 of magnetisable material. As those skilled in the art will appreciate, it is not essential for the magnet 10 to have this orientation. FIG. 12 schematically illustrates an embodiment in which the orientation of the magnet 10 is such that its magnetic axis is parallel to the film 25 of magnetisable material. As shown, the DC magnet 10 is provided at a height h above the surface of the film 25 of magnetisable material and the radius of the film 25 of magnetisable material is chosen relative to the height (h) of the DC magnet 10 so that the DC magnetic field 61 at points 71-1 and 71-2 is perpendicular to the surface of the film 25 of magnetisable material. Therefore, as the shaft 161 rotates, the positions of the spots 71-1 and 71-2 rotate around the surface of the film 25 of magnetisable material. Consequently, even with the magnetic axis of the DC magnet 10 oriented parallel with the film 25 of magnetisable material, the DC magnetic field 61 creates the above mentioned in-homogeneity spots 71 in the film 25 which can be detected in the above manner using the excitation winding 31, the sensor winding 33 and the processing electronics 23.

As those skilled in the art will appreciate, one drawback with the embodiment shown in FIG. 12 is that because there are two in-homogeneity spots 71 on the film 25 of magnetisable material, the processing electronics 23 is only able to unambiguously encode the rotation angle ($\alpha$) of the shaft 161 over one hundred and eighty degrees. If the shaft 161 can rotate beyond this, then the processing electronics 23 must track the relative rotation angle. This problem can also be overcome by rotating the orientation of the DC magnet 10 so that one of the in-homogeneity spots 71 does not fall on the film 25 of magnetisable material. Such an embodiment is illustrated in FIG. 13.

In particular, FIG. 13 illustrates an embodiment in which the magnet 10 is positioned at a height h above the film 25 of magnetisable material and which is rotated from the vertical through an angle of $\beta$. As shown, with this orientation, only one in-homogeneity spot 71 is created in the film 25 of magnetisable material. The other position ($R_2$) where the DC magnetic field 61 crosses through the plane in which the film 25 of magnetisable material lies is located at a distance $R_2$ from the shaft 161 where there is no film 25 of magnetisable material. Therefore, with the arrangement shown in FIG. 13, the processing electronics 23 can determine the rotation angle ($\alpha$) of the shaft 161 through a full three hundred and sixty degrees of rotation. As those skilled in the art will appreciate, the angle $\beta$, the height h and the radial position ($R_1$) of the in-homogeneity spot 71 are all related and must be chosen so that the in-homogeneity spot 71 falls on the film 25 of magnetisable material. Experiments have shown the following relationship between these variables:

| $\beta$ | Relationship between $R_1$ and h |
|---|---|
| 50° | $R_1 = 0.3$ h |
| 60° | $R_1 = 0.4$ h |
| 70° | $R_1 = 0.5$ h |
| 80° | $R_1 = 0.6$ h |
| 90° | $R_1 = 0.7$ h |

FIG. 14 illustrates a further alternative embodiment similar to the embodiment shown in FIG. 13. As shown, in this embodiment, the PCB 19 and the film 25 of magnetisable material have been tilted to face the DC magnet 10 such that the magnetic axis 69 of the DC magnet 10 is substantially perpendicular to the PCB 19 and the film 25 of magnetisable material. In this embodiment, the height (h) of the magnet 10 above the film and the rotation angle $\beta$ are chosen to match the radius (R) of the film 25 of magnetisable material according to:

$$R = h \tan(\beta)$$

FIG. 15 illustrates an alternative way of ensuring that only one in-homogeneity spot 71 is generated on the film 25 of the magnetisable material. In particular, in this embodiment, the DC magnet 10 is embedded within the shaft 161 so that it lies off the axis 181 of the shaft 161. Where the diameter of the shaft is larger than a few centimeters, this will result in only one in-homogeneity spot 71 in the film 25 of magnetisable material as the other side of the film 25 is too far away from the magnet 10 to experience a strong enough magnetic field.

FIG. 16 illustrates a further alternative embodiment for sensing the rotation angle ($\alpha$) of the shaft 161. In this embodiment, the magnet 10 is oriented so that its magnetic axis is perpendicular to the axis of rotation of the shaft 161 and perpendicular to the PCB 19 and film 25 of magnetisable material. In this embodiment, the PCB 19 carries an excitation winding 31 and sensor windings 171 and 175 which allow the processing electronics 23 to be able to detect the circumferential position of the magnet 10 (and hence the rotation angle of the shaft 161) as well as the height (h) of the shaft. This is illustrated in FIG. 16 by the different in-homogeneity spots 71. In particular, the spot 71-1 corresponds to the current angular position and height of the magnet 10 and spots 71-2 to 71-4 correspond to previous positions and heights of the magnet 10. As shown, as the shaft rotates and changes height, the position of the in-homogeneity spot on the film 25 changes relative to the sensor windings 171 and 175. Therefore, by processing the signals from sensor windings 171 and 175, the processing electronics can determine the current angular position and height of the shaft 161.

FIG. 17 schematically illustrates a further embodiment which allows the processing electronics 23 to detect the rotation angle ($\alpha$) and the height (h) of the shaft 161. As shown, in this embodiment, the film 25 of magnetisable material is formed as a cylinder around the shaft 161. In this embodiment, the sensor PCB 19 is formed as a ring with the excitation and sensor windings lying in a plane which is substantially perpendicular to the film 25 and the shaft 161. With this arrangement of the excitation winding, the excitation magnetic field will be substantially parallel with the plane of the film 25. However, the film 25 is much further away from the excitation winding 31 than in the first embodiment, therefore, the strength of the excitation magnetic field at the surface of the film 25 will still be below that required to saturate the film 25. However, the presence of the in-homogeneity spot 71 will still alter the mutual coupling between the excitation winding 31 and the sensor winding 33. Further, as represented by the spots 71-1 to 71-5, as the shaft 161 rotates and changes height, the position of the spot 71 on the film changes relative to the position of the sensor winding 33. Therefore, the signal output from the sensor winding will vary with the rotation angle and height of the shaft 161. By suitable processing of the signals output from the sensor winding, the processing electronics 23 can determine the height and rotation angle of the shaft 161.

FIG. 18 schematically illustrates a further embodiment which allows the processing electronics 23 to detect the rotation angle (α) and the height (h) of the shaft 161. As shown, in this embodiment, this is achieved by providing multiple sensor rings at different heights of the shaft 161. In particular, at a first range of heights, the in-homogeneity spot 71 will fall on magnetic film 25-1 and can therefore be detected by the excitation winding 31-1 and sensor winding 33-1 mounted on the PCB 19-1. However, as the shaft 161 moves vertically down, the in-homogeneity spot 71 will move onto the film 25-2, where it can be detected by the excitation winding 31-2 and the sensor winding 33-2 mounted on the PCB 19-2. Therefore, by processing the signals from the sensor windings on each PCB 19, the processing electronics 23 can detect both the height (h) and the rotation angle (α) of the shaft 161.

FIG. 19 schematically illustrates a further embodiment in which a two dimensional sensor board 19 (e.g. like the one shown in FIG. 8) is provided underneath a metallic plate 185 which houses a ball joint 187 to which a shaft 189 is attached. A DC magnet is provided inside the shaft 189 oriented with its magnetic axis aligned with the axis 191 of the shaft. As shown, the position of the in-homogeneity spot 71 at which the DC magnetic field 61 is perpendicular to the film 25 of magnetisable material will vary with the rotation angles α and θ. Therefore by appropriate processing of the signals from the sensor windings mounted on the PCB 19, the processing electronics 23 can determine the values of α and θ. In this embodiment, the space between the top of the metallic plate 185 and the magnetic film is provided in order to ensure that there is only one in-homogeneity spot 71 created by the DC magnetic field 61. Thick metallic plate 185 or any other non-magnetic spacer can be used for this purpose. If a spacer like the plate 185 is not provided then a second in-homogeneity spot may be generated in the film 25, especially for small angles of θ. This might complicate the algorithm used by the electronics to calculate the position of the shaft 189. However the electronics measurement set-up can be calibrated to accommodate thinner spacers when two in-homogeneity spots are altering the mutual coupling between the excitation and sensor coils.

Modifications

As those skilled in the art will appreciate, various modifications can be made to the above embodiments. Some of these modifications will now be described.

In the first embodiment described above, the DC magnet 10 was oriented with its magnetic axis parallel with the Z direction. This results in the position encoder being sensitive to rotational movement of the piston 7 about its axis. This is not a problem where the piston 7 is arranged so that it cannot rotate within the cylinder 3. However, in most piston and cylinder assemblies, the piston is free to rotate within the cylinder. Therefore, in a preferred embodiment, the magnet 10 is a ring magnet which is attached around the piston shaft so that the magnetic axis of the magnet is directed in the X direction shown in FIG. 1. With such an arrangement, the magnetic field generated by the magnet will be the same whether or not the piston 7 rotates within the cylinder 3.

In the above embodiments, the DC magnetic field 61 was generated by the DC magnet 10. As those skilled in the art will appreciate, the DC magnetic field 61 may be generated by using an electromagnet or by applying a DC current to an appropriately oriented coil. Additionally, it is not essential to use a DC magnet within the position encoder. In particular, the movable object (e.g. the piston) may carry an AC magnetic field generator which generates a positionally varying magnetic field. Provided this positionally varying magnetic field interacts with the film 25 of magnetic material so that its magnetisation state varies along the measurement path, a signal will be generated in the sensor winding when the excitation winding is energised with the excitation signal. In such an embodiment, the AC magnetic field generator mounted on the moving object preferably generates a low frequency signal that can penetrate through metallic walls. Additionally, in such an embodiment, the signal generated in the sensor winding will be at an intermodulation frequency defined by the difference in frequency between the two AC magnetic fields.

In the first embodiment, the magnetisable material that was used was a soft ferromagnetic material having high initial and maximum permeability and a low coercivity. As those skilled in the art will appreciate, other magnetisable materials may be used. For example amorphous alloys such as VITROVAC from Vacuumschmelze or Nano-crystalline alloys such as VITROPERM from Vacuumschmelze, silicon iron alloys with three percent silicon, pure iron, nickel iron alloys, cobalt iron alloys etc.

In the first embodiment described above, the sensor windings were each formed from two turns of conductor. As those skilled in the art will appreciate, the use of two turn sensor windings is not essential. Any number of turns may be provided. Preferably, as many turns as possible are provided in the space allowed by the dimensions of the PCB 19 as this maximises signal levels obtained from the sensor windings.

Similarly, in the first embodiment described above, the excitation winding included a single turn of conductor. As those skilled in the art will appreciate, the number of turns of conductor for the excitation winding and for the sensor windings can be varied in order to vary the reactive impedance of the windings to match the impedance of the appropriate output or input of the excitation and processing electronics.

In the first embodiment described above, the position encoder was used to determine the position of a piston within a cylinder. As those skilled in the art will appreciate, the position sensor described above may be used in a number of different applications. For example, it can be used in shock absorbers, damping cylinders, syringes, machine tool applications, etc.

In the above embodiment, the position of the piston determined by the processing electronics was displayed on a display. As those skilled in the art will appreciate, in alternative embodiments, the position information may be provided to another computer system for controlling another part of a system. For example, where the piston and cylinder assembly forms part of an engine, the determined position may be supplied to an engine management unit which can use the position information to control the timing of ignition of the fuel mixture within the piston and cylinder assembly.

In the above embodiment, the excitation current applied to the excitation winding had a frequency of approximately 500 kHz. As those skilled in the art will appreciate, it is not essential to use such an excitation frequency. Excitation frequencies between 10 kHz and 100 MHz are preferably used.

In the above embodiment, specific excitation and processing electronics were described that were used to energise the excitation winding and to process the signals generated in the sensor windings. As those skilled in the art will appreciate, various different types of excitation and processing circuitry can be used. For example, the excitation and sensing method described in WO 03/038379 may be used. In this system, the excitation signal is applied to the sin and cos sensor windings with the signal generated in the excitation winding being processed to extract the positional information.

In the first embodiment described above, the sensor windings were formed in a figure of eight configuration. As those skilled in the art will appreciate, it is not essential to form the sensor windings in such a figure of eight configuration. The only requirement of the sensor windings is that they are able to detect a magnetic field which positionally varies along the measurement direction. This can be achieved by a single sensor winding positioned at a position along the measurement path. Alternatively, it can be achieved using a sensor winding which geometrically varies along the measurement path. This geometrical variation may be its shape along the measurement direction or its dimensions such as the thickness of the conductor forming the sensor winding or the number of turns of the sensor winding etc.

In all of the embodiments described above, the sensor windings and the film of magnetic material have been fixed and the magnet was mounted in the movable member. As those skilled in the art will appreciate, the position encoder described above will operate where the magnet is stationary and where the sensor windings move relative to the magnet. Additionally, the sensor windings and/or the excitation windings may move in addition to the magnet. All that is necessary is that there is relative movement between the magnet and at least one of the sensor winding and the excitation winding. Similarly, it is not essential for the film of magnetic material to be fixed relative to the excitation and sensor windings. The magnetic material may move with the movable object or it may move independently of the object. However, since the film of magnetic material is substantially homogenous, movement of the film relative to the sensor windings will not affect the operation of the position encoder.

In the above embodiments, the excitation winding and the or each sensor winding were formed as conductor tracks on a printed circuit board. As those skilled in the art will appreciate the excitation winding and the or each sensor winding may be formed using any conductive material, such as conductive inks which can be printed on an appropriate substrate or conductive wire wound in the appropriate manner. Additionally, it is not essential for the excitation winding and the sensor winding to be mounted on the same member. For example, two separate printed circuit boards may be provided, one carrying the excitation winding and the other carrying the or each sensor winding. In such an embodiment, the excitation winding and the sensor windings may be located on the same side of the film of magnetisable material or they may be mounted on opposite sides.

In the above embodiment, the excitation signal applied to the excitation winding was an AC signal at a particular frequency. As those skilled in the art will appreciate, it is not essential for the excitation signal to be AC. For example, the excitation signal may be any cyclically varying signal.

In the first embodiment described above, two phase quadrature sensor windings were provided. As those skilled in the art will appreciate, it is not essential to use sensor windings that are in phase quadrature. For example, instead of using the cos sensor winding, a second sensor winding phase shifted by an eighth of the pitch along the measurement path may be used. However, as those skilled in the art will appreciate, the use of phase quadrature sensor windings is preferred as this simplifies the processing to be performed by the processing electronics to determine the position of the movable member. Additionally, as those skilled in the art will appreciate, in embodiments that use sensor windings that provide signal levels that vary substantially sinusoidally with the position of the movable member, it is not essential to only use two sensor windings. For example, three or four sensor windings may be provided each separated along the measurement path by an appropriate distance.

In the first embodiment described above, an AC current was applied to the excitation winding having a peak amplitude of 50 mA. As those skilled in the art will appreciate, it is not essential to apply an excitation current with this peak amplitude. The magnitude of the excitation current is preferably chosen depending on the position and layout of the excitation winding relative to the film of magnetisable material so that the excitation magnetic field generated by the excitation winding will not saturate the film in the vicinity of the sensor winding. Therefore, appropriate excitation current strengths may vary from 0.01 mA to 10 A.

In the first embodiment described above, the film of magnetic material had a thickness of less than 0.2 mm. As those skilled in the art will appreciate, films of various thicknesses may be used. Preferably, the thickness of the material is between 20 microns to 2 mm as such films are readily available.

In the embodiments described above, the film of magnetic material and the PCB had approximately the same width and extent along the measurement direction. In a preferred embodiment, the width and length of the film of magnetisable material is preferably greater than the width and length of the PCB, as this minimises edge effects associated with the edge of the film of magnetisable material (which can alter the balance between the excitation and sensor windings).

As those skilled in the art will appreciate, inductive position sensing systems such as those described above can operate in a reciprocal manner. More specifically, all of the above embodiments could be changed so that the excitation and processing electronics 23 apply the excitation current to the or each described sensor winding and process the signal generated in the described excitation winding. For example, in the first embodiment described above, the excitation and processing electronics 23 may be arranged to apply a respective excitation signal to sensor windings 33 and 41 and to process the resulting signals generated in excitation winding 31. In this case, the sensor windings 33 and 41 may be energised in turn or they may be simultaneously energised with excitation currents at different frequencies.

In the above embodiment, the film of magnetisable material was initially unsaturated and the DC magnet created an in-homogeneity spot in the film. The position of this in-homogeneity spot was then detected by detecting the change in the mutual inductance between an excitation winding and a sensor winding. As those skilled in the art will appreciate, the film of magnetisable material does not have to be initially in an unsaturated state. A strong background (or bias) magnetic field may be provided near the film which saturates the entire film. Such a fully saturated film is still homogenous and will not alter the mutual coupling between the excitation and sensor windings. Provided the DC magnet carried by the moving member is strong enough to counter the effects of the saturating field to create an in-homogeneity region in the film, a similar imbalance will be created between the excitation and sensor windings. This can then be detected in the manner described above in the first embodiment As those skilled in the art will appreciate, the position of this in-homogeneity region will not correspond to the position where the DC magnetic field is perpendicular to the film, but where the DC field is strong enough to counter the effect of the bias field.

The invention claimed is:

1. A position encoder comprising:
  first and second members which are relatively movable along a measurement path;

an excitation winding and one or more a sensor windings, at least one of the excitation winding and the one or more sensor windings being carried by the first member;

a DC magnetic field generator carried by the second member and operable to generate a DC magnetic field which varies with position along the measurement path;

a film of magnetizable material which is located, in use, within said positionally varying DC magnetic field to cause the film to have a positionally varying magnetization state along the measurement path;

wherein the excitation and sensor windings are arranged relative to said film so that a mutual electromagnetic coupling between them varies in dependence upon the positionally varying magnetization state of said film of magnetizable material, so that when said excitation winding is energized with an excitation signal, a sensor signal is generated in the one or more sensor windings that varies with the relative position between said first and second members;

an excitation circuit operable to generate an excitation signal having an excitation frequency for energizing the excitation winding to cause the excitation winding to generate an excitation electromagnetic field; and a processing circuit operable to process sensor signals generated in the one or more sensor windings which are at substantially the same frequency as said excitation frequency, to determine a value of a ratiometric function, which value is indicative of the relative position between the first and second relatively movable members, wherein said excitation electromagnetic field comprises a first component which is orthogonal to the surface of the film and a second component which is parallel to the surface of the film and wherein the excitation winding and the excitation circuit are arranged so that the magnitude of said second component is insufficient to drive the film into and out of saturation in the vicinity of said one or more sensor windings.

2. A position encoder comprising:

first and second members which are relatively movable along a measurement path;

an excitation winding and one or more a sensor windings, at least one of the excitation winding and the one or more sensor windings being carried by the first member;

a DC magnetic field generator carried by the second member and operable to generate a DC magnetic field which varies with position along the measurement path;

a film of magnetizable material which is located, in use, within said positionally varying DC magnetic field to cause the film to have a positionally varying magnetization state along the measurement path;

wherein the excitation and sensor windings are arranged relative to said film so that a mutual electromagnetic coupling between them varies in dependence upon the positionally varying magnetization state of said film of magnetizable material, so that when said excitation winding is energized with an excitation signal, a sensor signal is generated in the one or more sensor windings that varies with the relative position between said first and second members;

an excitation circuit operable to generate an excitation signal having an excitation frequency for energizing the excitation winding to cause the excitation winding to generate an excitation electromagnetic field; and a processing circuit operable to process sensor signals generated in the one or more sensor windings which are at substantially the same frequency as said excitation frequency, to determine a value of a ratiometric function, which value is indicative of the relative position between the first and second relatively movable members, wherein said magnetic field generated by said magnetic field generator creates an in-homogeneity spot in said film, the position of which varies with the relative position between the first and second relatively movable members and wherein said excitation and sensor windings are arranged so that the mutual electromagnetic coupling between them varies in dependence upon the position of said in-homogeneity spot in the film.

3. A position encoder according to claim 2, wherein said in-homogeneity spot comprises an unsaturated region of the magnetizable material surrounded by a saturated region of the magnetizable material.

4. A position encoder according to claim 2, wherein said in-homogeneity spot is created at a position in the film where the magnetic field generated by said magnetic field generator is substantially perpendicular to the film of magnetizable material.

5. A position encoder comprising:

first and second members which are relatively movable along a measurement path;

an excitation winding and one or more a sensor windings, at least one of the excitation winding and the one or more sensor windings being carried by the first member;

a DC magnetic field generator carried by the second member and operable to generate a DC magnetic field which varies with position along the measurement path;

a film of magnetizable material which is located, in use, within said positionally varying DC magnetic field to cause the film to have a positionally varying magnetization state along the measurement path;

wherein the excitation and sensor windings are arranged relative to said film so that a mutual electromagnetic coupling between them varies in dependence upon the positionally varying magnetization state of said film of magnetizable material, so that when said excitation winding is energized with an excitation signal, a sensor signal is generated in the one or more sensor windings that varies with the relative position between said first and second members;

an excitation circuit operable to generate an excitation signal having an excitation frequency for energizing the excitation winding to cause the excitation winding to generate an excitation electromagnetic field; and a processing circuit operable to process sensor signals generated in the one or more sensor windings which are at substantially the same frequency as said excitation frequency, to determine a value of a ratiometric function, which value is indicative of the relative position between the first and second relatively movable members, wherein said at least one winding which is carried by said first member is arranged along said measurement path in a geometrically varying manner.

6. A position encoder according to claim 5, wherein said winding carried by said first member geometrically varies along the measurement path so that said sensor signal generated in said sensor winding varies substantially sinusoidally with the relative position between said first and second relatively movable members.

7. A position encoder comprising:

first and second members which are relatively movable along a measurement path;

an excitation winding and one or more a sensor windings, at least one of the excitation winding and the one or more sensor windings being carried by the first member;

a DC magnetic field generator carried by the second member and operable to generate a DC magnetic field which varies with position along the measurement path;

a film of magnetizable material which is located, in use, within said positionally varying DC magnetic field to cause the film to have a positionally varying magnetization state along the measurement path;

wherein the excitation and sensor windings are arranged relative to said film so that a mutual electromagnetic coupling between them varies in dependence upon the positionally varying magnetization state of said film of magnetizable material, so that when said excitation winding is energized with an excitation signal, a sensor signal is generated in the one or more sensor windings that varies with the relative position between said first and second members;

an excitation circuit operable to generate an excitation signal having an excitation frequency for energizing the excitation winding to cause the excitation winding to generate an excitation electromagnetic field; and a processing circuit operable to process sensor signals generated in the one or more sensor windings which are at substantially the same frequency as said excitation frequency, to determine a value of a ratiometric function, which value is indicative of the relative position between the first and second relatively movable members, wherein a winding carried by said first member comprises at least two loops of conductor which extend along the measurement direction and which are connected in series in a figure of eight arrangement.

8. A position encoder comprising:

first and second members which are relatively movable along a measurement path;

an excitation winding and one or more a sensor windings, at least one of the excitation winding and the one or more sensor windings being carried by the first member;

a DC magnetic field generator carried by the second member and operable to generate a DC magnetic field which varies with position along the measurement path;

a film of magnetizable material which is located, in use, within said positionally varying DC magnetic field to cause the film to have a positionally varying magnetization state along the measurement path;

wherein the excitation and sensor windings are arranged relative to said film so that a mutual electromagnetic coupling between them varies in dependence upon the positionally varying magnetization state of said film of magnetizable material, so that when said excitation winding is energized with an excitation signal, a sensor signal is generated in the one or more sensor windings that varies with the relative position between said first and second members;

an excitation circuit operable to generate an excitation signal having an excitation frequency for energizing the excitation winding to cause the excitation winding to generate an excitation electromagnetic field; and a processing circuit operable to process sensor signals generated in the one or more sensor windings which are at substantially the same frequency as said excitation frequency, to determine a value of a ratiometric function, which value is indicative of the relative position between the first and second relatively movable members.

9. A position encoder according to claim 8, wherein said excitation winding is arranged relative to said film so that said excitation electromagnetic field is substantially perpendicular to the film along the measurement direction.

10. A position encoder according to claim 8, comprising first and second sensor windings that are separated along said measurement path and which are arranged so that when said excitation winding is energised with said excitation signal, a respective sensor signal is generated in each sensor winding that varies with the relative position between said first and second members, and wherein said processing circuit is operable to process the sensor signals generated in said first and second sensor windings to determine the value of said ratiometric function, which value is indicative of the relative position between the first and second relatively movable members.

11. A position encoder according to claim 8, comprising a plurality of excitation windings each operable to generate an excitation electromagnetic field when energized by said excitation circuit, wherein each excitation winding and the or each sensor winding are arranged relative to said film so that a mutual electromagnetic coupling between them varies in dependence upon the positionally varying magnetization state of said film of magnetizable material, so that when each excitation winding is energized with an excitation signal, a respective sensor signal is generated in the or each sensor winding that varies with the relative position between said first and second members and wherein said processing circuit is operable to process the sensor signals generated in the or each sensor winding to determine the value of said a ratiometric function, which value is indicative of the relative position between the first and second relatively movable members.

12. A position encoder according to claim 8, wherein said magnetic field generator is operable to generate a magnetic field having a magnetic axis which lies at an angle to said film.

13. A position encoder according to claim 12, wherein said magnetic field generator is operable to generate a magnetic field having an axis which is substantially perpendicular to said film.

14. A position encoder according to claim 8, comprising a plurality of sensor windings and wherein each sensor winding is provided adjacent to a different portion of said film of magnetizable material and is sensitive to the magnetization state of the film adjacent the respective sensor winding.

15. A position encoder according to claim 8, wherein said film of magnetizable material has a high permeability and a low coercivity.

16. A position encoder according to claim 8, wherein said film of magnetizable material comprises at least one of: pure iron, nickel iron alloy, cobalt iron alloy, an amorphous alloy, nano crystalline alloy or a silicon iron.

17. A position encoder according to claim 8, wherein said measurement path is linear.

18. A position encoder according to claim 8, wherein said measurement path is circular.

19. A position encoder according to claim 8, wherein said excitation and sensor windings extend along different measurement paths and wherein said processing circuit is operable to process the signals generated in said sensor winding to determine a multi-dimensional relative position between said first and second relatively movable members.

20. A method of determining relative position of first and second relatively movable members, the method comprising the steps of:

providing a position encoder according to claim 8;

causing said excitation circuit to generate said excitation signal at said excitation frequency for energizing the excitation winding; and processing sensor signals induced in the one or more sensor windings which are at substantially the same frequency as said excitation frequency and which vary in dependence upon the relative position of the first and second members, to determine a value of a ratiometric function, which value is indicative of the relative position between the first and second relatively movable members.

21. A position encoder comprising:

first and second members which are relatively movable along a measurement path;

an excitation winding and one or more a sensor windings, at least one of the excitation winding and the one or more sensor windings being carried by the first member;

a DC magnetic field generator carried by the second member and operable to generate a DC magnetic field which varies with position along the measurement path;

a film of magnetizable material which is located, in use, within said positionally varying DC magnetic field to cause the film to have a positionally varying magnetization state along the measurement path;

wherein the excitation and sensor windings are arranged relative to said film so that a mutual electromagnetic coupling between them varies in dependence upon the positionally varying magnetization state of said film of magnetizable material, so that when said excitation winding is energized with an excitation signal, a sensor signal is generated in the one or more sensor windings that varies with the relative position between said first and second members;

an excitation circuit operable to generate an excitation signal having an excitation frequency for energizing the excitation winding to cause the excitation winding to generate an excitation electromagnetic field; and a processing circuit operable to process sensor signals generated in the one or more sensor windings which are at substantially the same frequency as said excitation frequency, to determine a value of a ratiometric function, which value is indicative of the relative position between the first and second relatively movable members, wherein said processing circuit is operable to combine said sensor signals with a signal having the same frequency as said excitation frequency.

22. A position encoder according to claim 21, wherein said processing circuit is operable to mix said sensor signals with a signal having the same frequency as said excitation frequency.

23. A position encoder according to claim 8, wherein said excitation winding and said one or more sensor windings are arranged so that, in the absence of said magnetic field generator, there is substantially no electromagnetic coupling between them.

24. A position encoder according to claim 23, wherein the excitation winding and the one or more sensor windings lie in substantially the same plane.

25. A sensor according to claim 8, comprising a printed circuit board carrying conductive tracks that define said excitation and sensor windings and on which said film of the magnetizable material is carried.

* * * * *